United States Patent
Li et al.

(10) Patent No.: US 11,503,647 B2
(45) Date of Patent: Nov. 15, 2022

(54) BEAM MANAGEMENT FOR DIRECT AND INDIRECT LINKS

(71) Applicant: QUALCOMM Incorporated, San Diego, CA (US)

(72) Inventors: Junyi Li, Chester, NJ (US); Navid Abedini, Somerset, NJ (US); Raju Hormis, New York, NY (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 16/858,503

(22) Filed: Apr. 24, 2020

(65) Prior Publication Data

US 2020/0344813 A1    Oct. 29, 2020

Related U.S. Application Data

(60) Provisional application No. 62/840,278, filed on Apr. 29, 2019.

(51) Int. Cl.
*H04W 74/08*    (2009.01)
*H04W 72/04*    (2009.01)
(Continued)

(52) U.S. Cl.
CPC ...... *H04W 74/0833* (2013.01); *H04B 7/0695* (2013.01); *H04W 56/001* (2013.01); *H04W 72/0473* (2013.01)

(58) Field of Classification Search
CPC ........... H04W 74/0833; H04W 56/001; H04W 72/0473; H04W 16/26; H04W 74/008;
(Continued)

(56) References Cited

U.S. PATENT DOCUMENTS

2010/0322145 A1\* 12/2010 Yu ..................... H04W 74/0833
370/315
2010/0323614 A1\* 12/2010 Yu ........................ H04W 48/18
455/7
(Continued)

FOREIGN PATENT DOCUMENTS

EP            2557872 A1    2/2013
WO      2008015562 A2    2/2008
(Continued)

OTHER PUBLICATIONS

WO2012032579A1—Google Translated (Year: 2012).\*
International Search Report and Written Opinion—PCT/US2020/030110—ISA/EPO—dated Jul. 24, 2020.

*Primary Examiner* — Chi H Pham
*Assistant Examiner* — Ji-Hae Yea
(74) *Attorney, Agent, or Firm* — Harrity & Harrity LLP/Qualcomm Incorporated

(57) ABSTRACT

Various aspects of the present disclosure generally relate to wireless communication. In some aspects, a base station may receive a random access channel (RACH) message. The base station may determine, based at least in part on the RACH message, whether the RACH message was transmitted directly to the base station by a user equipment (UE) or whether the RACH message was relayed from the UE to the base station via a millimeter wave repeater. The base station may perform a beam management procedure based at least in part on the determination. Numerous other aspects are provided.

30 Claims, 12 Drawing Sheets

(51) Int. Cl.
*H04W 56/00* (2009.01)
*H04B 7/06* (2006.01)

(58) Field of Classification Search
CPC ............. H04W 74/004; H04W 84/047; H04W 28/0231; H04B 7/0695; H04B 7/2606; H04L 43/065; H04L 43/0864; H04L 1/0035; H03G 2201/702; H04N 1/32021
See application file for complete search history.

(56) References Cited

U.S. PATENT DOCUMENTS

| | | | |
|---|---|---|---|
| 2011/0149885 A1* | 6/2011 | Bachu | H04W 74/008 370/329 |
| 2011/0256826 A1 | 10/2011 | Ode et al. | |
| 2013/0083753 A1* | 4/2013 | Lee | H04L 1/1858 370/329 |
| 2019/0124696 A1 | 4/2019 | Islam et al. | |
| 2019/0380099 A1* | 12/2019 | Hakola | H04W 56/001 |
| 2020/0413359 A1* | 12/2020 | Li | H04W 56/0015 |
| 2021/0084657 A1* | 3/2021 | Hashemi | H04W 74/008 370/329 |

FOREIGN PATENT DOCUMENTS

| | | | | |
|---|---|---|---|---|
| WO | 2010051539 A2 | 5/2010 | | |
| WO | 2012032579 A1 | 3/2012 | | |
| WO | WO-2012032579 A1 * | 3/2012 | ........... | H04B 7/2606 |

* cited by examiner

BEAM MANAGEMENT FOR DIRECT AND INDIRECT LINKS

CROSS-REFERENCE TO RELATED APPLICATION

This Patent Application claims priority to U.S. Provisional Patent Application No. 62/840,278, filed on Apr. 29, 2019, entitled "BEAM MANAGEMENT FOR DIRECT AND INDIRECT LINKS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for beam management for direct and indirect links.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful, for example, to improve network density. Preferably, these improvements should be applicable to other multiple access technologies and the telecommunication standards that employ these technologies.

SUMMARY

In some aspects, a method of wireless communication, performed by a base station, may include receiving a random access channel (RACH) message; determining, based at least in part on the RACH message, whether the RACH message was transmitted directly to the base station by a user equipment (UE) or whether the RACH message was relayed from the UE to the base station via a millimeter wave repeater; and performing a beam management procedure based at least in part on the determination.

In some aspects, a method of wireless communication, performed by a UE, may include receiving a configuration that indicates a first resource set and a second resource set for beam management, wherein the first resource set is configured for beam management for a direct link between the UE and a base station, and the second resource set is configured for beam management for an indirect link between the UE and the base station via a millimeter wave repeater; receiving a first message in the first resource set and a second message in the second resource set; and transmitting a RACH message in a RACH occasion corresponding to the first resource set based at least in part on receiving the first message in the first resource set and the second message in the second resource set.

In some aspects, a method of wireless communication, performed by a millimeter wave repeater, may include receiving a configuration that instructs the millimeter wave repeater to refrain from relaying communications received in a first resource set corresponding to a first time interval and to relay communications received in a second resource set corresponding to a second time interval that overlaps with the first time interval, wherein the first resource set is configured for beam management for a direct link between a UE and a base station and the second resource set is configured for beam management for an indirect link between the UE and the base station via the millimeter wave repeater; receiving a timing synchronization signal to determine the first time interval and the second time interval; and receiving and relaying a communication in the second resource set in the second time interval.

In some aspects, a base station for wireless communication may include memory and one or more processors operatively coupled to the memory. The memory and the one or more processors may be configured to receive a RACH message; determine, based at least in part on the RACH message, whether the RACH message was transmitted directly to the base station by a UE or whether the RACH message was relayed from the UE to the base station via a millimeter wave repeater; and perform a beam management procedure based at least in part on the determination.

In some aspects, a UE for wireless communication may include memory and one or more processors operatively coupled to the memory. The memory and the one or more processors may be configured to receive a configuration that indicates a first resource set and a second resource set for beam management, wherein the first resource set is configured for beam management for a direct link between the UE and a base station, and the second resource set is configured for beam management for an indirect link between the UE and the base station via a millimeter wave repeater; receive a first message in the first resource set and a second message in the second resource set; and transmit a RACH message in a RACH occasion corresponding to the first resource set based at least in part on receiving the first message in the first resource set and the second message in the second resource set.

In some aspects, a millimeter wave repeater for wireless communication may include memory and one or more processors operatively coupled to the memory. The memory and the one or more processors may be configured to receive a configuration that instructs the millimeter wave repeater to refrain from relaying communications received in a first resource set corresponding to a first time interval and to relay communications received in a second resource set corresponding to a second time interval that overlaps with the first time interval, wherein the first resource set is configured for beam management for a direct link between a UE and a base station and the second resource set is configured for beam management for an indirect link between the UE and the base station via the millimeter wave repeater; receive a timing synchronization signal to determine the first time interval and the second time interval; and receive and relay a communication in the second resource set in the second time interval.

In some aspects, a non-transitory computer-readable medium may store one or more instructions for wireless communication. The one or more instructions, when executed by one or more processors of a base station, may cause the one or more processors to: receive a RACH message; determine, based at least in part on the RACH message, whether the RACH message was transmitted directly to the base station by a UE or whether the RACH message was relayed from the UE to the base station via a millimeter wave repeater; and perform a beam management procedure based at least in part on the determination.

In some aspects, a non-transitory computer-readable medium may store one or more instructions for wireless communication. The one or more instructions, when executed by one or more processors of a UE, may cause the one or more processors to: receive a configuration that indicates a first resource set and a second resource set for beam management, wherein the first resource set is configured for beam management for a direct link between the UE and a base station, and the second resource set is configured for beam management for an indirect link between the UE and the base station via a millimeter wave repeater; receive a first message in the first resource set and a second message in the second resource set; and transmit a RACH message in a RACH occasion corresponding to the first resource set based at least in part on receiving the first message in the first resource set and the second message in the second resource set.

In some aspects, a non-transitory computer-readable medium may store one or more instructions for wireless communication. The one or more instructions, when executed by one or more processors of a millimeter wave repeater, may cause the one or more processors to: receive a configuration that instructs the millimeter wave repeater to refrain from relaying communications received in a first resource set corresponding to a first time interval and to relay communications received in a second resource set corresponding to a second time interval that overlaps with the first time interval, wherein the first resource set is configured for beam management for a direct link between a UE and a base station and the second resource set is configured for beam management for an indirect link between the UE and the base station via the millimeter wave repeater; receive a timing synchronization signal to determine the first time interval and the second time interval; and receive and relay a communication in the second resource set in the second time interval.

In some aspects, an apparatus for wireless communication may include means for receiving a RACH message; means for determining, based at least in part on the RACH message, whether the RACH message was transmitted directly to the apparatus by a UE or whether the RACH message was relayed from the UE to the apparatus via a millimeter wave repeater; and means for performing a beam management procedure based at least in part on the determination.

In some aspects, an apparatus for wireless communication may include means for receiving a configuration that indicates a first resource set and a second resource set for beam management, wherein the first resource set is configured for beam management for a direct link between the apparatus and a base station, and the second resource set is configured for beam management for an indirect link between the apparatus and the base station via a millimeter wave repeater; means for receiving a first message in the first resource set and a second message in the second resource set; and means for transmitting a RACH message in a RACH occasion corresponding to the first resource set based at least in part on receiving the first message in the first resource set and the second message in the second resource set.

In some aspects, an apparatus for wireless communication may include means for receiving a configuration that instructs the apparatus to refrain from relaying communications received in a first resource set corresponding to a first time interval and to relay communications received in a second resource set corresponding to a second time interval that overlaps with the first time interval, wherein the first resource set is configured for beam management for a direct link between a UE and a base station and the second resource set is configured for beam management for an indirect link between the UE and the base station via the apparatus; means for receiving a timing synchronization signal to determine the first time interval and the second time interval; and means for receiving and relaying a communication in the second resource set in the second time interval.

Aspects generally include a method, apparatus, system, computer program product, non-transitory computer-readable medium, user equipment, base station, millimeter wave repeater, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
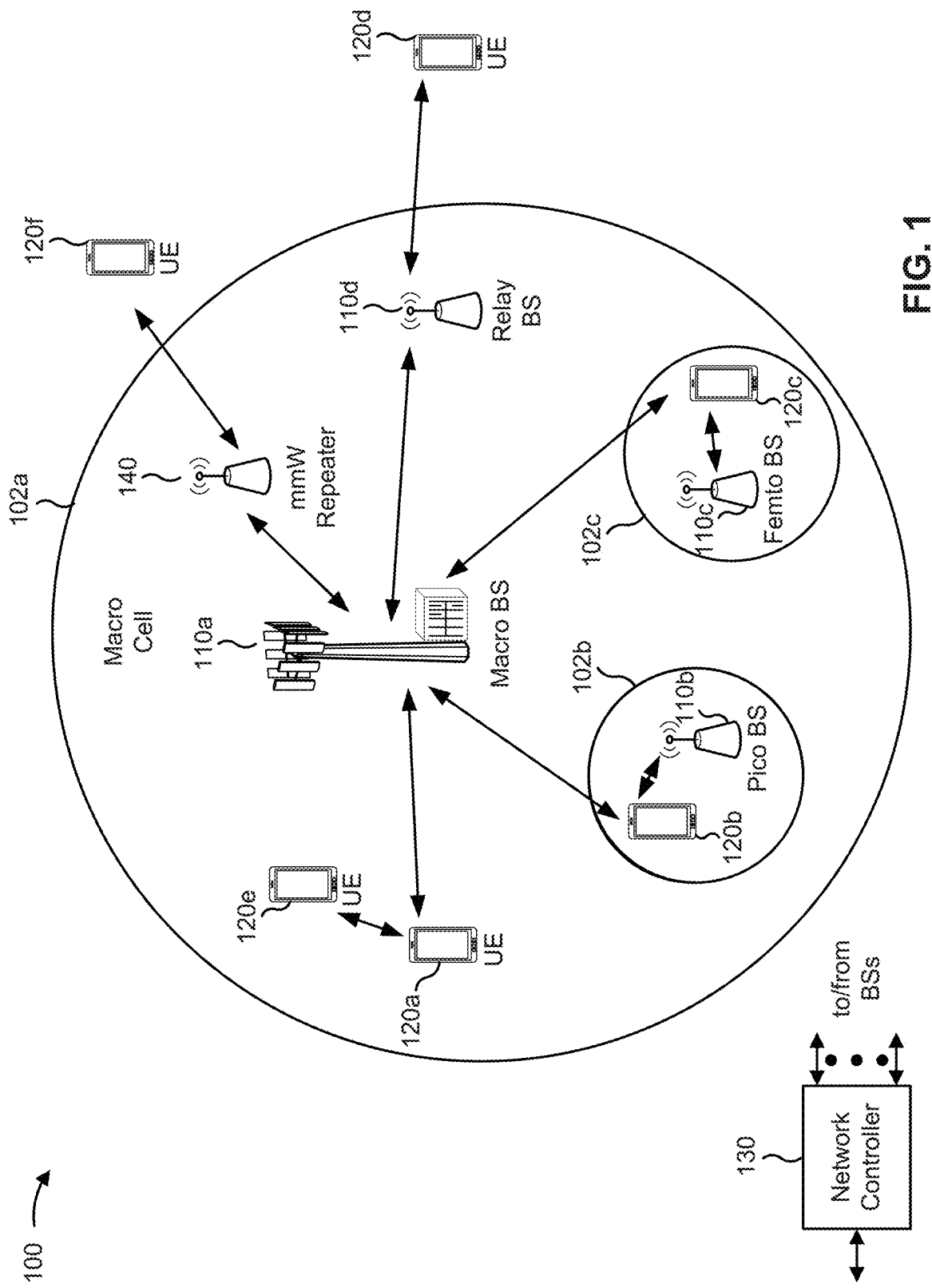
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a millimeter wave (mmW) repeater 140 may receive a millimeter wave signal (e.g., an analog millimeter wave signal) from a base station 110, may amplify the millimeter wave signal, and may transmit the amplified millimeter wave signal to one or more UEs 120 (e.g., shown as UE 120f). In some aspects, the mmW repeater 140 may be an analog mmW repeater, sometimes also referred to as a layer 1 mmW repeater. Additionally, or alternatively, the mmW repeater 140 may be a wireless transmit receive point (TRP) acting as a distributed unit (e.g., of a 5G access node) that communicates wirelessly with a base station 110 acting as a central unit or an access node controller (e.g., of the 5G access node). The mmW repeater may receive, amplify, and transmit the analog mmW signal without performing analog-to-digital conversion of the analog mmW signal and/or without performing any digital signal processing on the mmW signal. In this way, latency may be reduced and a cost to produce the mmW repeater 140 may be reduced. Additional details regarding mmW repeater 140 are provided elsewhere herein.

As indicated above, FIG. 1 is provided as an example. Other examples may differ from what is described with regard to FIG. 1.

Figure 2:
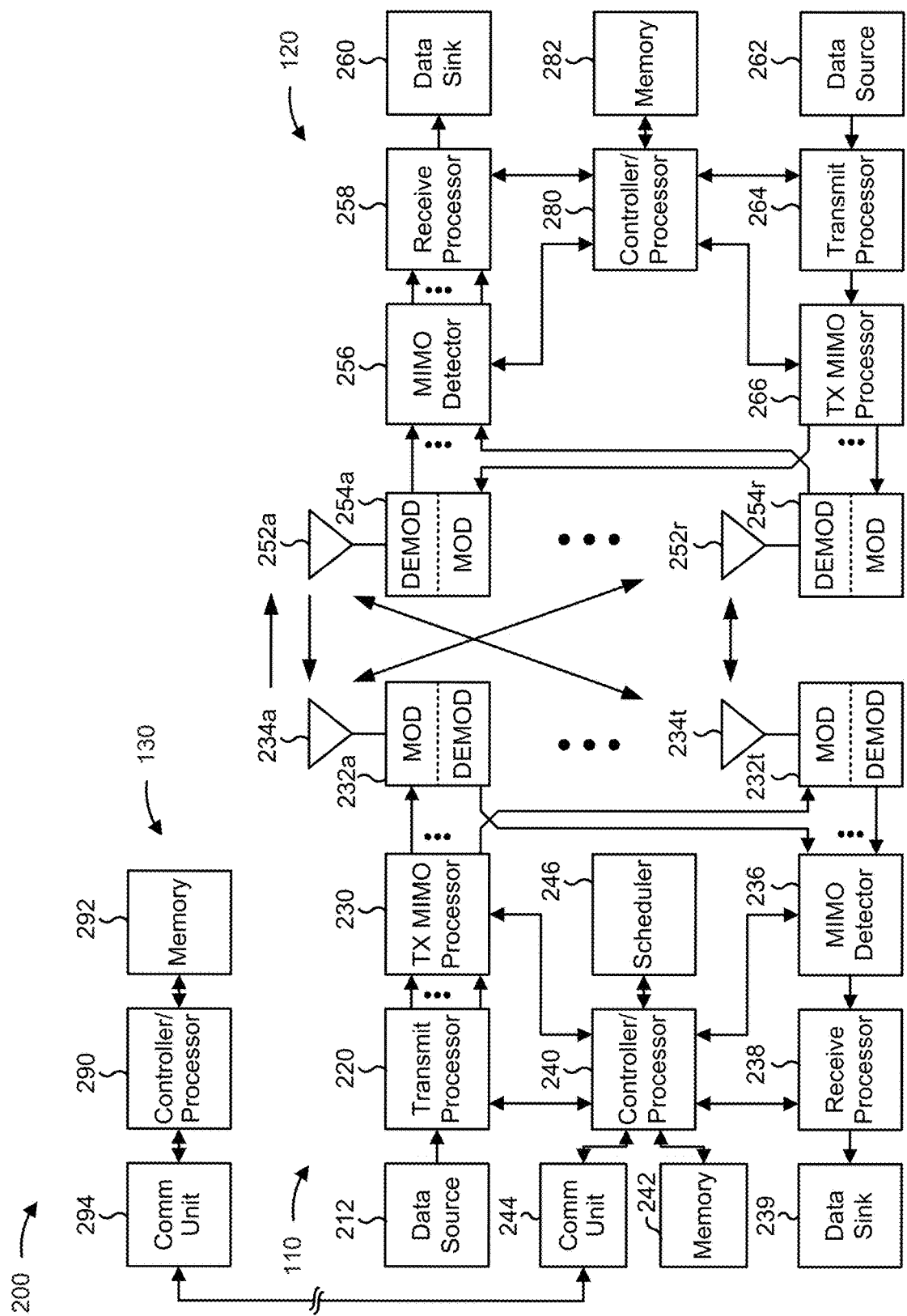
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with beam management for direct and indirect links, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. As such, memory 242 of the base station 110 can comprise a non-transitory computer-readable medium storing one or more instructions for wireless communication, where the one or more instructions comprise one or more instructions that, when executed by one or more processors (e.g., receive processor 238, transmit processor 220, and/or controller/processor 240) of the base station 110, instruct the one or more processors to perform the method described in greater detail with reference to FIGS. 7, 8, 9, and/or 10. Similarly, memory 282 of the UE 120 can comprise a non-transitory computer-readable medium storing one or more instructions for wireless communication, where the one or more instructions comprise one or more instructions that, when executed by one or more processors (e.g., receive processor 258, transmit processor 264, and/or controller/processor 280) of the UE 120, instruct the one or more processors to perform the method described in greater detail with reference to FIGS. 7, 8, 9, and/or 11. A scheduler 246 may schedule UEs for data transmission on the downlink and/or uplink.

In some aspects, the UE 120 may include means for receiving a configuration that indicates a first resource set and a second resource set for beam management, wherein the first resource set is configured for beam management for a direct link between the UE and a base station, and the second resource set is configured for beam management for an indirect link between the UE and the base station via a millimeter wave repeater (e.g., using antenna 252, DEMOD 254, MIMO detector 256, receive processor 258, controller/processor 280, memory 282, and/or the like); means for receiving a first message in the first resource set and a second message in the second resource set (e.g., using antenna 252, DEMOD 254, MIMO detector 256, receive processor 258, controller/processor 280, memory 282, and/or the like); means for transmitting a RACH message in a RACH occasion corresponding to the first resource set based at least in part on receiving the first message in the first resource set and the second message in the second resource set (e.g., using controller/processor 280, transmit processor 264, TX MIMO processor 266, MOD 254, antenna 252, and/or the like); and/or the like. In some aspects, such means may include one or more components of UE 120 described in connection with FIG. 2.

In some aspects, the base station 110 may include means for receiving a RACH message (e.g., using antenna 234, DEMOD 232, MIMO detector 236, receive processor 238, controller/processor 240, and/or the like); means for determining, based at least in part on the RACH message, whether the RACH message was transmitted directly to the base station by a UE or whether the RACH message was relayed from the UE to the base station via a millimeter wave repeater (e.g., using antenna 234, DEMOD 232, MIMO detector 236, receive processor 238, controller/processor 240, and/or the like); means for performing a beam management procedure based at least in part on the determination (e.g., using transmit processor 220, TX MIMO processor 230, MOD 232, DEMOD 232, MIMO detector 236, antenna 234, receive processor 238, controller/processor 240, and/or the like); and/or the like. In some aspects, such means may include one or more components of base station 110 described in connection with FIG. 2.

As indicated above, FIG. 2 is provided as an example. Other examples may differ from what is described with regard to FIG. 2.

Figure 3:
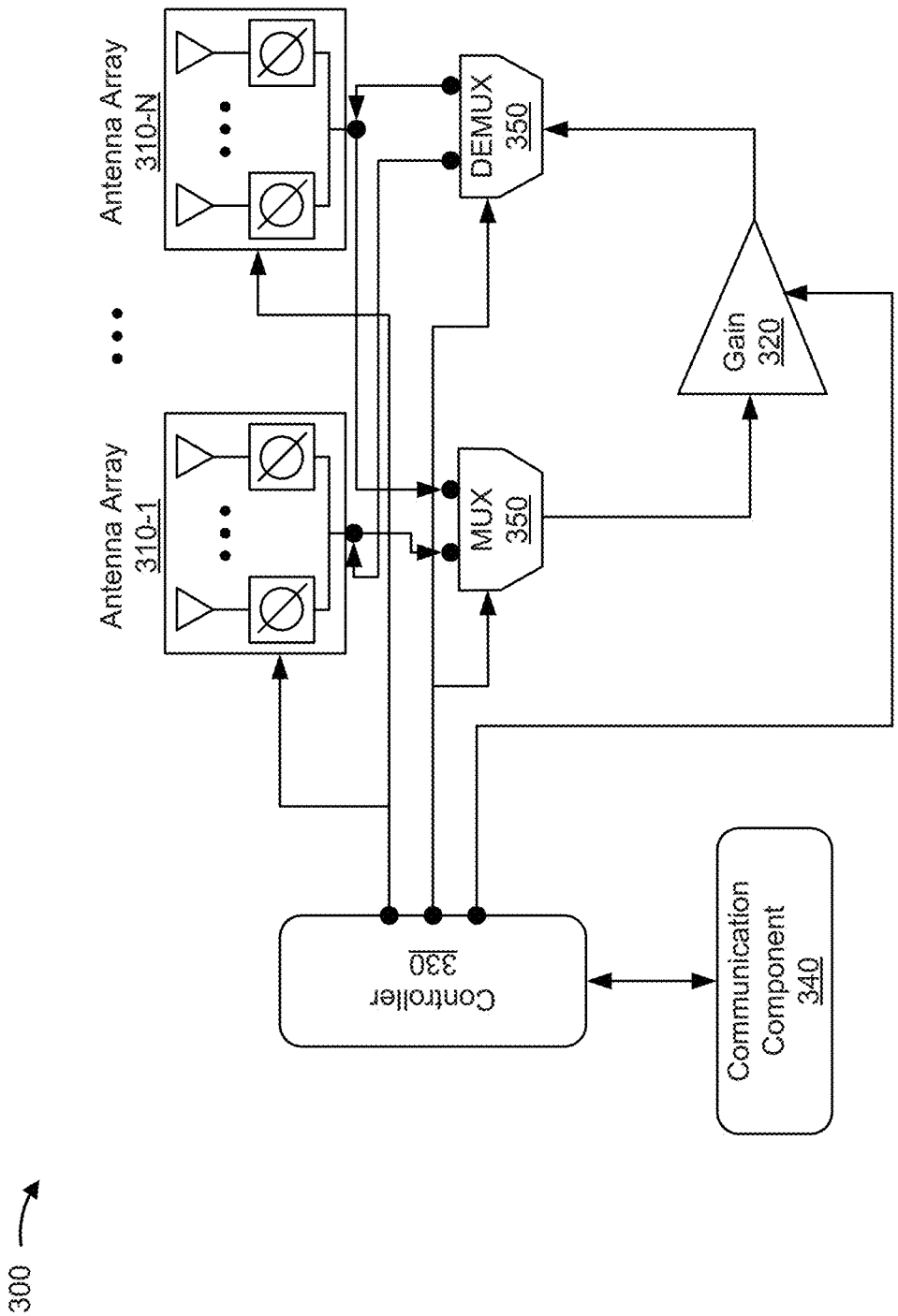
FIG. 3 is a diagram illustrating an example millimeter wave repeater, in accordance with various aspects of the present disclosure.

FIG. 3 is a diagram illustrating an example of a millimeter wave repeater 300, in accordance with various aspects of the present disclosure. In some aspects, millimeter wave repeater 300 may correspond to millimeter wave repeater 140 shown in FIG. 1.

As shown in FIG. 3, the millimeter wave repeater 300 may include one or more antenna arrays 310-1 through 310-N (N>1), a gain component 320, a controller 330, a communication component 340, and a multiplexer (MUX) and/or demultiplexer (DEMUX) (MUX/DEMUX) 350.

An antenna array 310 includes multiple antenna elements capable of being configured for beamforming. For example, an antenna array 310 may be referred to as a phased array because phase values and/or phase offsets of the antenna elements may be configured to form a beam, with different phase values and/or phase offsets being used for different beams (e.g., in different directions). In some aspects, an antenna array 310 may be a fixed receive (RX) antenna array capable of only receiving communications while not transmitting communications. In some aspects, an antenna array 310 may be a fixed transmit (TX) antenna array capable of only transmitting communications while not receiving communications. In some aspects, an antenna array 310 may be capable of being configured to act as an RX antenna array or a TX antenna array (e.g., via a TX/RX switch, a MUX/DEMUX, and/or the like). The antenna arrays 310 may be capable of communicating using millimeter waves.

Gain component 320 includes a component capable of amplifying an input signal and outputting an amplified signal. For example, gain component 320 may include a power amplifier, a variable gain component, and/or the like. In some aspects, gain component 320 may have variable gain control. The gain component 320 may connect to an RX antenna array (e.g., a first antenna array 310-1) and a TX antenna array (e.g., a second antenna array 310-2) such that an analog millimeter wave signal, received via the RX antenna array, can be amplified by the gain component 320 and output to the TX antenna array for transmission. In some aspects, the level of amplification of the gain component 320 may be controlled by the controller 330.

Controller 330 includes a component capable of controlling one or more other components of the millimeter wave repeater 300. For example, the controller 330 may include a controller, a microcontroller, a processor, and/or the like. In some aspects, the controller 330 may control the gain component 320 by controlling a level of amplification or gain applied by the gain component 320 to an input signal. Additionally, or alternatively, the controller 330 may control an antenna array 310 by controlling a beamforming configuration for the antenna array 310 (e.g., one or more phase values for the antenna array 310, one or more phase offsets for the antenna array 310, one or more power parameters for the antenna array 310, one or more beamforming parameters for the antenna array 310, a TX beamforming configuration, an RX beamforming configuration, and/or the like), by controlling whether the antenna array 310 acts as an RX antenna array or a TX antenna array (e.g., by configuring interaction and/or connections between the antenna array 310 and a MUX/DEMUX 350), and/or the like. Additionally, or alternatively, the controller 330 may power on or power off one or more components of millimeter wave repeater 300 (e.g., when a base station 110 does not need to use the millimeter wave repeater to serve UEs 120). In some aspects, the controller 330 may control a timing of one or more of the above configurations.

Communication component 340 may include a component capable of wirelessly communicating with a base station 110 using a wireless technology other than millimeter wave (e.g., via a control interface). For example, the communication component 340 may communicate with the base station 110 using a personal area network (PAN) technology (e.g., Bluetooth, Bluetooth Low Energy (BLE), and/or the like), a 4G or LTE radio access technology, a narrowband Internet of Things (NB-IoT) technology, a sub-6 GHz technology, a visible light communication technology, and/the like. In some aspects, the communication component 340 may use a lower frequency communication technology, and an antenna array 310 may use a higher frequency communication technology (e.g., millimeter wave and/or the like). In some aspects, an antenna array 310 may be used to transfer data between the millimeter wave repeater 300 and the base station 110, and the communication component 340 may be used to transfer control information between the millimeter wave repeater 300 and the base station 110 (e.g., a report, a configuration, instructions to power on or power off one or more components, and/or the like).

MUX/DEMUX 350 may be used to multiplex and/or demultiplex communications received from and/or transmitted to an antenna array 310. For example, MUX/DEMUX 350 may be used to switch an RX antenna array to a TX antenna array.

In some aspects, the millimeter wave repeater 300 does not include any components for digital signal processing. For example, in some aspects, the millimeter wave repeater 300 does not include a digital signal processor, a baseband processor, a digital-to-analog converter (DAC), an analog-to-digital converter (ADC), and/or the like. In this way, a cost to produce the millimeter wave repeater 300 may be reduced. Furthermore, latency may be reduced by eliminating digital processing of received millimeter wave signals prior to transmission of corresponding amplified millimeter wave signals.

In some aspects, one or more antenna arrays 310, gain component 320, controller 330, communication component 340, MUX/DEMUX 350, and/or the like may perform one or more techniques associated with communicating with and/or configuring an analog millimeter wave repeater, as described in more detail elsewhere herein. For example, one or more components (e.g., a processor, a controller, a memory, and/or the like) of millimeter wave repeater 300 may perform or direct operations of, for example, process 1200 of FIG. 12 and/or other processes as described herein. In some aspects, a memory of the millimeter wave repeater 300 can comprise a non-transitory computer-readable medium storing one or more instructions for wireless communication, where the one or more instructions comprise one or more instructions that, when executed by one or more processors of the millimeter wave repeater 300, instruct the one or more processors to perform the method described in greater detail with reference to FIGS. 7, 8, 9, and/or 12.

In some aspects, millimeter wave repeater 300 may include means for receiving a configuration that instructs the millimeter wave repeater to refrain from relaying communications received in a first resource set corresponding to a first time interval and to relay communications received in a second resource set corresponding to a second time interval that overlaps with the first time interval, wherein the first resource set is configured for beam management for a direct link between a UE and a base station and the second resource set is configured for beam management for an indirect link between the UE and the base station via the millimeter wave repeater (e.g., using antenna array 310, controller 330, communication component 340, MUX/DEMUX 350, and/or the like); means for receiving a timing synchronization signal to determine the first time interval and the second time interval (e.g., using antenna array 310, controller 330, communication component 340, MUX/DEMUX 350, and/or the like); means for receiving and relaying a communication in the second resource set in the second time interval (e.g., using antenna array 310, controller 330, communication component 340, MUX/DEMUX 350, and/or the like); and/or the like. In some aspects, such means may include one or more components of millimeter wave repeater 300 described in connection with FIG. 3.

As indicated above, FIG. 3 is provided as an example. Other examples may differ from what is described with regard to FIG. 3. For example, millimeter wave repeater 300 may include additional components, fewer components, different components, or differently arranged components than those shown in FIG. 3. Furthermore, two or more components shown in FIG. 3 may be implemented within a single component, or a single component shown in FIG. 3 may be implemented as multiple components. Additionally, or alternatively, a set of components (e.g., one or more components) of millimeter wave repeater 300 may perform one or more functions described as being performed by another set of components of millimeter wave repeater 300.

Figure 4:
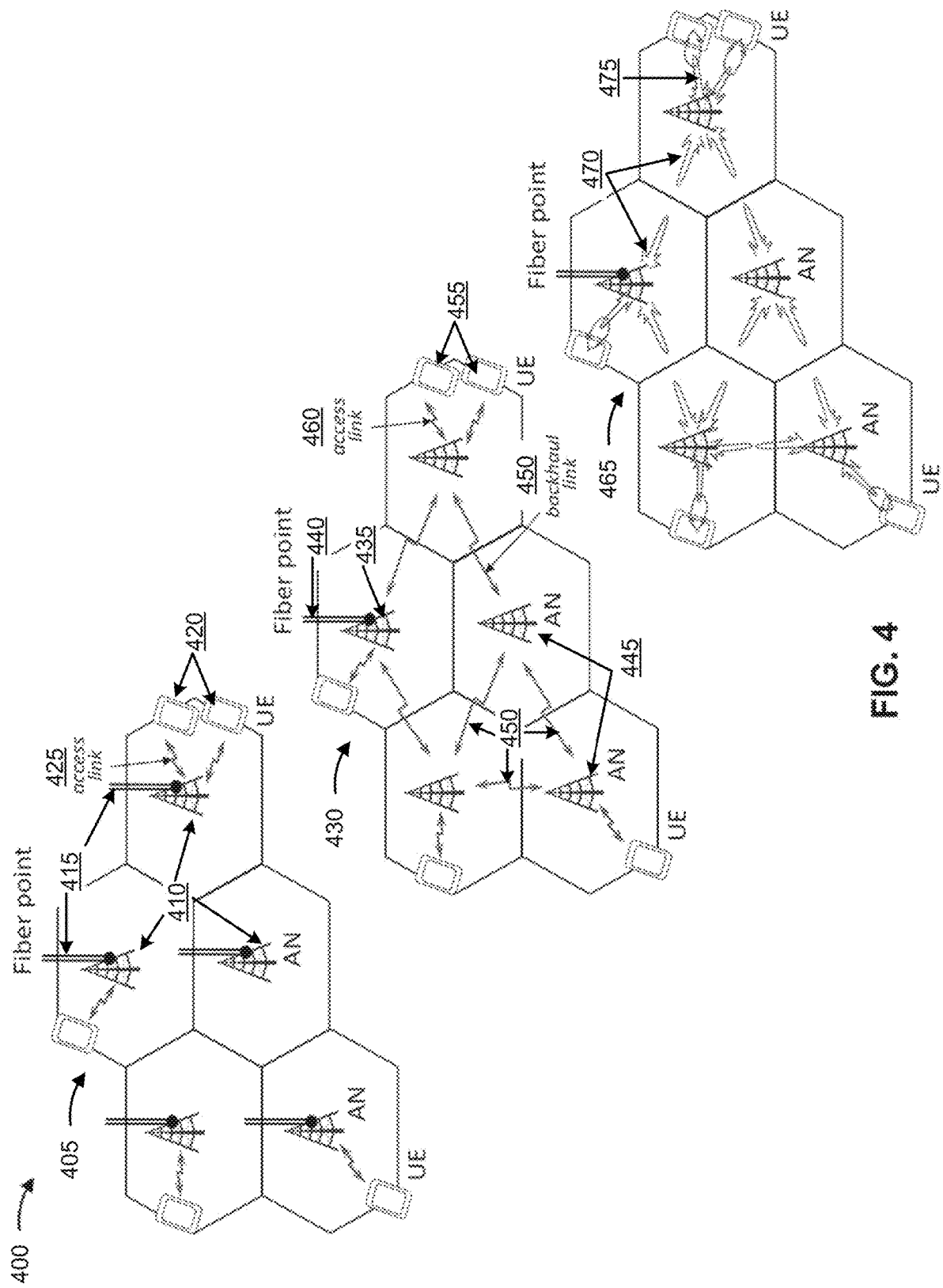
FIG. 4 is a diagram illustrating examples of radio access networks, in accordance with various aspects of the present disclosure.

FIG. 4 is a diagram illustrating examples 400 of radio access networks, in accordance with various aspects of the disclosure.

As shown by reference number 405, a traditional (e.g., 3G, 4G, LTE, and/or the like) radio access network may include multiple base stations 410 (e.g., access nodes (AN)), where each base station 410 communicates with a core network via a wired backhaul link 415, such as a fiber connection. A base station 410 may communicate with a UE 420 via an access link 425, which may be a wireless link. In some aspects, a base station 410 shown in FIG. 4 may correspond to a base station 110 shown in FIG. 1. Similarly, a UE 420 shown in FIG. 4 may correspond to a UE 120 shown in FIG. 1.

As shown by reference number 430, a radio access network may include a wireless backhaul network, sometimes referred to as an integrated access and backhaul (IAB) network. In an IAB network, at least one base station is an anchor base station 435 that communicates with a core network via a wired backhaul link 440, such as a fiber connection. An anchor base station 435 may also be referred to as an IAB donor (or IAB-donor). The IAB network may include one or more non-anchor base stations 445, sometimes referred to as relay base stations or IAB nodes (or IAB-nodes). The non-anchor base station 445 may communicate directly with or indirectly with (e.g., via one or more other non-anchor base stations 445) the anchor base station 435 via one or more backhaul links 450 to form a backhaul path to the core network for carrying backhaul traffic. Backhaul link 450 may be a wireless link. Anchor base station(s) 435 and/or non-anchor base station(s) 445 may communicate with one or more UEs 455 via access links 460, which may be wireless links for carrying access traffic. In some aspects, an anchor base station 435 and/or a non-anchor base station 445 shown in FIG. 4 may correspond to a base station 110 shown in FIG. 1. Similarly, a UE 455 shown in FIG. 4 may correspond to a UE 120 shown in FIG. 1.

As shown by reference number 465, in some aspects, a radio access network that includes an IAB network may utilize millimeter wave technology and/or directional communications (e.g., beamforming, precoding, and/or the like) for communications between base stations and/or UEs (e.g., between two base stations, between two UEs, and/or between a base station and a UE). For example, wireless backhaul links 470 between base stations may use millimeter waves to carry information and/or may be directed toward a target base station using beamforming, precoding, and/or the like. Similarly, the wireless access links 475 between a UE and a base station may use millimeter waves and/or may be directed toward a target wireless node (e.g., a UE and/or a base station). In this way, inter-link interference may be reduced.

In some aspects, an IAB network may support a multi-hop network and/or a multi-hop wireless backhaul. Additionally, or alternatively, each node of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported. In some aspects, an IAB donor may include a central unit (CU) that configures IAB nodes that access a core network via the IAB donor and may include a distributed unit (DU) that schedules and communicates with child nodes of the IAB donor. An IAB node may include a mobile terminal (MT) that is scheduled by and communicates with a DU of a parent node and may include a DU that schedules and communicates with child nodes of the IAB donor. A DU of a node may perform functions described in connection with base station 110 for that node, and an MT of a node may perform functions described in connection with UE 120 for that node.

When an IAB network or another type of wireless communication network uses millimeter wave communications, network density and/or propagation distances can be improved by using a millimeter wave repeater 140, as described below.

As indicated above, FIG. 4 is provided as an example. Other examples may differ from what is described with regard to FIG. 4.

Figure 5:
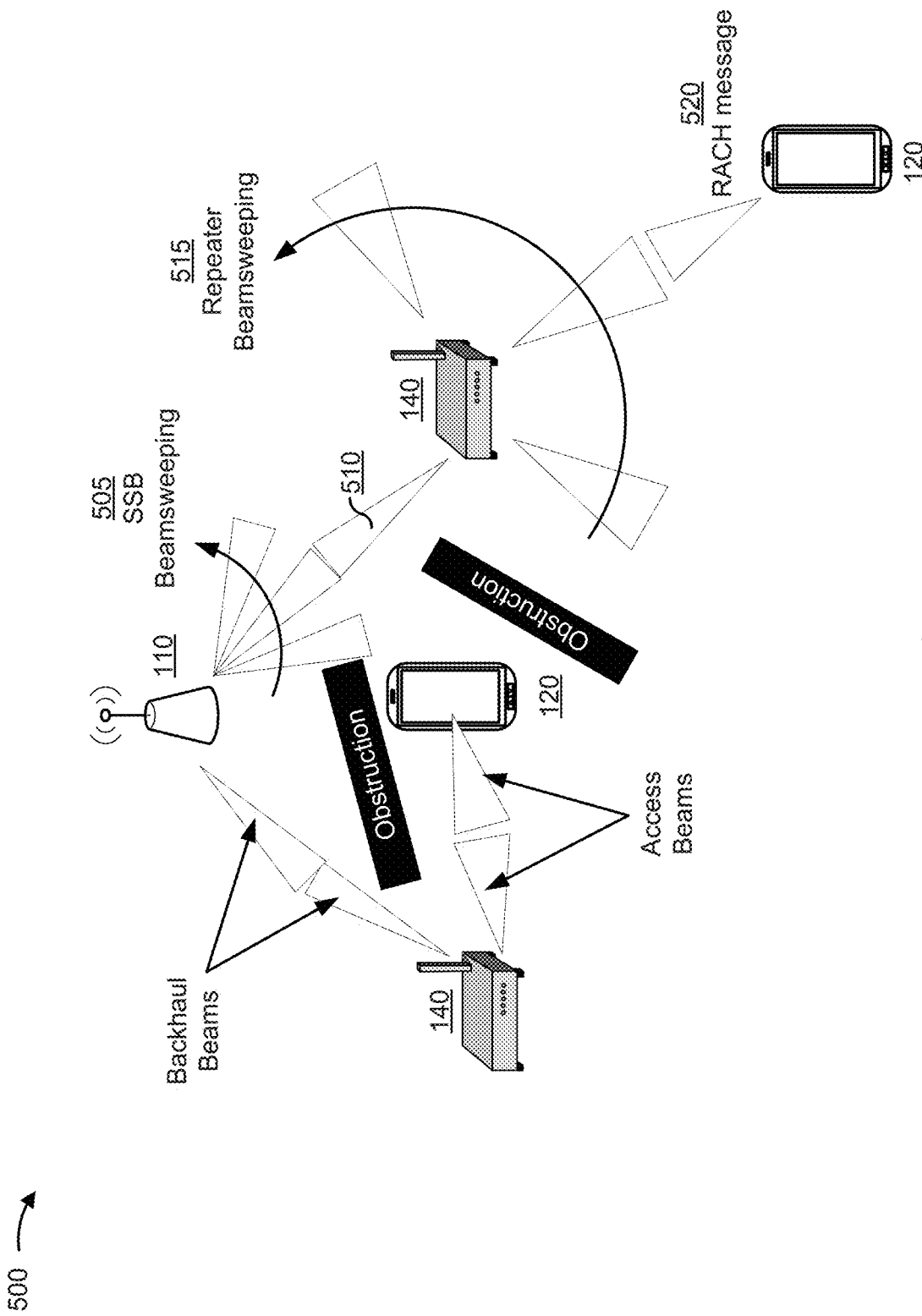
FIG. 5 is a diagram illustrating an example of communicating using a millimeter wave repeater, in accordance with various aspects of the present disclosure.

FIG. 5 is a diagram illustrating an example 500 of communicating using a millimeter wave repeater, in accordance with various aspects of the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 110 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 to increase the coverage area of a base station 110, to extend coverage to UEs 120 without line of sight to the base station 110 (e.g., due to an obstruction), and/or the like. Furthermore, the millimeter wave repeater 140 described herein may be a layer 1 or an analog millimeter wave repeater, which is associated with a lower cost, less processing, and lower latency than a layer 2 or layer 3 repeater.

As shown in FIG. 5, a millimeter wave repeater 140 (sometimes referred to herein as a repeater 140) may perform directional communication by using beamforming to communicate with a base station 110 via a first beam pair (e.g., a backhaul beam pair over a backhaul link with the base station 110) and to communicate with a UE 120 via a second beam pair (e.g., an access beam pair over an access link with the UE 120). A beam pair may refer to a transmit (Tx) beam used by a first device for transmission and a receive (Rx) beam used by a second device for reception.

As shown by reference number 505, to assist with initial network access, a base station 110 may use a beamsweeping procedure to transmit synchronization signal blocks (SSBs) via multiple beams over time (e.g., using time division multiplexing (TDM)). An SSB may include timing information (e.g., a primary synchronization signal (PSS) and a secondary synchronization signal (SSS)), system information (e.g., remaining minimum system information (RMSI), system information in a physical broadcast channel (PBCH), and/or the like), and/or information that identifies a beam via which the SSB is transmitted (e.g., a beam index). As shown by reference number 510, the repeater 140 may receive one or more SSBs via an Rx beam of the repeater 140.

As shown by reference number 515, the repeater 140 may relay the received SSB(s) via multiple Tx beams of the repeater 140 (e.g., using TDM). As shown by reference number 520, a UE 120 may receive a relayed SSB and may use information included in the SSB (e.g., timing information, system information, and/or a beam index) to generate a random access channel (RACH) message and transmit the RACH message in a RACH occasion to the repeater 140 for relaying to the base station 110 as part of a network access procedure (e.g., a RACH procedure). The RACH message transmitted by the UE 120 may include a RACH preamble (sometimes referred to as RACH MSG 1) in a four-step RACH procedure or may include the RACH preamble and a RACH payload (transmitted in RACH MSG A that combines RACH MSG 1 and RACH MSG 3) in a two-step RACH procedure. Upon reception of the RACH message, the base station 110 may transmit a RACH response, which may include RACH MSG 2 in a four-step RACH procedure or RACH MSG B (which combined RACH MSG 2 and RACH MSG 4) in a two-step RACH procedure. Based at least in part on information carried in the RACH message(s) and the RACH response(s), the UE 120 and the base station 110 may proceed to establish a connection (e.g., using a radio resource control (RRC) configuration procedure).

Although the repeater 140 is shown as using beamsweeping to relay communications received from a base station 110, in some aspects the repeater 140 may relay communications using a single Tx beam (or a subset of Tx beams configured for the repeater 140), may relay communications using a widebeam (e.g., a pseudo omni-directional beam), and/or the like. Regardless of a beam relaying configuration of the repeater 140, the base station 110 may not be able to determine whether a RACH message, received by the base station 110, was received directly from a UE 120 (e.g., without being relayed by a repeater 140) or was received indirectly from a UE 120 via a repeater 140, as described below in connection with FIG. 6.

As indicated above, FIG. 5 is provided as an example. Other examples may differ from what is described with regard to FIG. 5.

Figure 6:
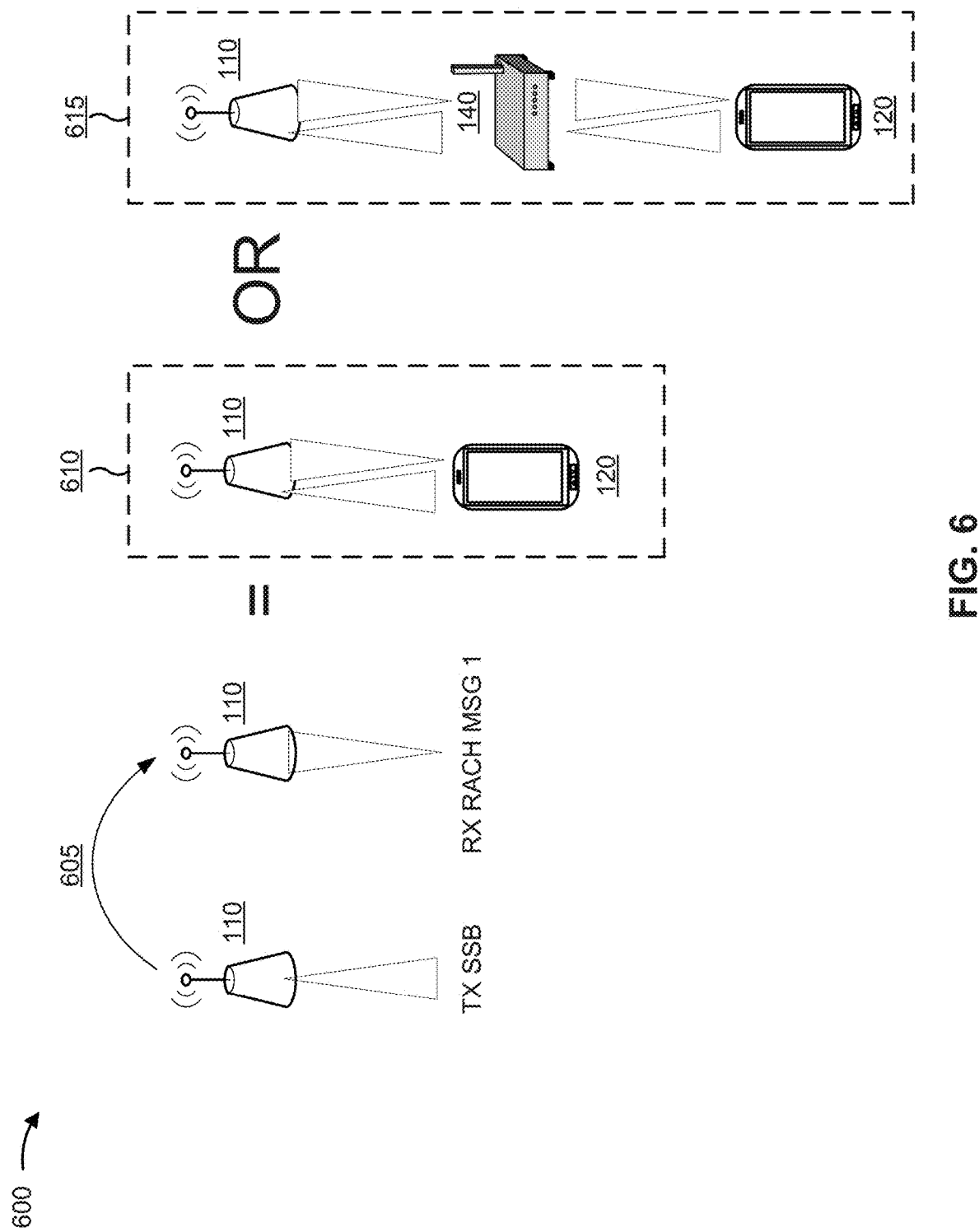
FIG. 6 is a diagram illustrating an example of a direct link between a UE and a base station and an indirect link between a UE and a base station, in accordance with various aspects of the present disclosure.

FIG. 6 is a diagram illustrating an example 600 of a direct link between a UE 120 and a base station 110 and an indirect link between a UE 120 and a base station 110, in accordance with various aspects of the present disclosure.

As shown by reference number 605, a base station 110 may transmit an SSB (e.g., as part of an SSB beamsweeping procedure, as described above in connection with FIG. 5) and may receive a RACH message (shown as RACH MSG 1) in a RACH occasion corresponding to the SSB (e.g., via an Rx beam corresponding to a Tx beam used to transmit the SSB, in a time domain and/or frequency domain resource corresponding to the transmitted SSB, and/or the like). However, the base station 110 may be incapable of determining whether the RACH message was received directly from a UE 120 (e.g., without being relayed by a repeater 140) as shown by reference number 610, or whether the RACH message was received indirectly from a UE 120 via a repeater 140 (e.g., one or more repeaters 140) as shown by reference number 615.

The base station 110 may operate differently depending on whether the RACH message is received directly or indirectly from a UE 120. For example, performing beam management and/or beam configuration when the base station 110 communicates indirectly with a UE 120 via a repeater 140 may require more resources of the base station 110 (e.g., processing resources, memory resources, and/or the like), may require more resources of the UE 120 (e.g., processing resources, memory resources, battery power, and/or the like), may require more resources of the repeater 140 (e.g., processing resources, memory resources, battery power, and/or the like), may require more network resources (e.g., time resources, frequency resources, spatial resources, and/or the like), and may lead to higher interference levels than when the base station 110 communicates directly with the UE 120.

Early detection of whether the base station 110 is communicating directly or indirectly with the UE 120 may permit such resources to be conserved and such interference to be reduced when the base station 110 communicates directly with the UE 120. In some cases, the repeater 140 may be powered down if the base station 110 communicates directly with the UE 120, thereby conserving resources of the repeater 140. Furthermore, appropriate beam management and beam configuration may be performed depending on whether the base station 110 communicates directly or indirectly with the UE 120. Some techniques and apparatuses described herein permit such early detection (e.g., during a RACH procedure) of whether the base station 110 communicates directly or indirectly with a UE 120.

As indicated above, FIG. 6 is provided as an example. Other examples may differ from what is described with regard to FIG. 6.

Figure 7:
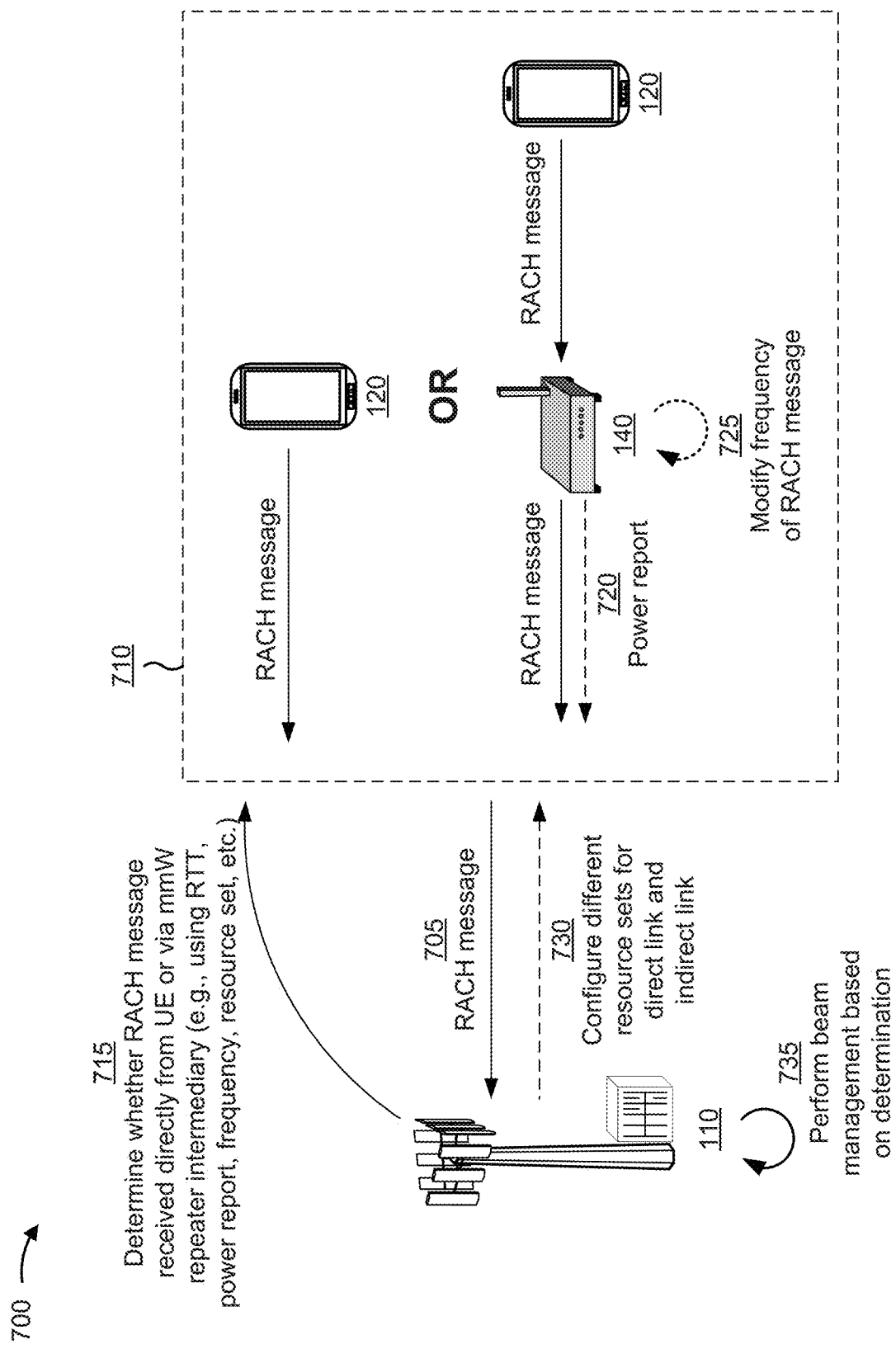
FIGS. 7-9 are diagrams illustrating examples of beam management for direct and indirect links, in accordance with various aspects of the present disclosure.

FIG. 7 is a diagram illustrating an example 700 of beam management for direct and indirect links, in accordance with various aspects of the present disclosure.

As shown by reference number 705, a base station 110 may receive a RACH message as part of a RACH procedure, as described above. For example, the base station 110 may transmit a set of SSBs and may receive a RACH message in a RACH occasion (e.g., a time and/or frequency resource) corresponding to an SSB included in the set of SSBs. The RACH message transmitted by the UE 120 may include a RACH preamble (sometimes referred to as RACH MSG 1) in a four-step RACH procedure or may include the RACH preamble and a RACH payload (transmitted in RACH MSG A that combines RACH MSG 1 and RACH MSG 3) in a two-step RACH procedure.

As shown by reference number 710, in some cases, the base station 110 may receive the RACH message directly from a UE 120. In some cases, the RACH message may be received indirectly from a UE 120 via a repeater 140 that receives the RACH message from the UE 120 and relays the RACH message to the base station 110.

As shown by reference number 715, the base station 110 may determine, based at least in part on the RACH message, whether the RACH message was transmitted directly to the base station 110 by a UE 120 or whether the RACH message was relayed from the UE 120 to the base station 110 via a repeater 140 (e.g., using the repeater 140 as an intermediary). The base station 110 may use one or more techniques described herein (e.g., in connection with reference numbers 720-730 of FIG. 7 and/or one or more techniques described in connection with FIG. 8 and/or FIG. 9) to make this determination. For example, the base station 110 may use a round trip time (RTT), a power report, a frequency, and/or a resource set associated with the RACH message to determine whether the RACH message was received via a direct link with a UE 120 (e.g., without being relayed by a repeater 140) or via an indirect link with a UE 120 (e.g., with relaying by a repeater 140).

In some aspects, the base station 110 may estimate a round trip time associated with the RACH message and may determine whether the RACH message was received via a direct link with a UE 120 or via an indirect link with a UE 120 based at least in part on the estimate round trip time. For example, the base station 110 may compare the estimated round trip time to a threshold. The threshold may represent and/or may be based at least in part on a round trip time for a communication with the repeater 140. In this case, if the estimated round trip time is less than the threshold, then the base station 110 may determine that the RACH message was received via a direct link with a UE 120. If the estimated round trip time is greater than or equal to the threshold, then the base station 110 may determine that the RACH message was received via an indirect link with a UE 120.

As shown by reference number 720, in some aspects, the repeater 140 may transmit a power report to the base station 110. In some aspects, the repeater 140 may be configured by the base station 110 to transmit the power report. For example, the configuration may indicate one or more RACH occasions for which the repeater 140 is to transmit a power report. The repeater 140 may determine a signal power of an input signal received by the repeater 140 in a RACH occasion (e.g., via a beam and/or a millimeter wave interface) and may report the signal power to the base station 110 via a control interface (e.g., via a sub-6 GHz interface, via communication component 340, and/or the like).

The power report may indicate whether a RACH message was relayed by the repeater 140 in the RACH occasion. For example, if the power report indicates a signal power that satisfies a threshold for a RACH occasion (e.g., is greater than a threshold, is greater than or equal to a threshold, and/or the like), then this may indicate that the repeater 140 received a RACH message from the UE 120 in the RACH occasion (e.g., leading to the signal power that satisfies the threshold) and relayed the RACH message to the base station. If the power report indicates a signal power that does not satisfy a threshold for a RACH occasion (e.g., is less than a threshold, is less than or equal to a threshold, and/or the like), then this may indicate that the repeater 140 did not receive a RACH message from the UE 120 in the RACH occasion. Thus, the base station 110 may determine that the RACH message was transmitted directly to the base station 110 by a UE 120 if the signal power does not satisfy a threshold. Conversely, the base station 110 may determine that the RACH message was received indirectly from a UE 120 (e.g., was relayed via the repeater 140) if the signal power satisfies the threshold.

As shown by reference number 725, in some aspects, the repeater 140 may modify the RACH message received from the UE 120 and may transmit the modified RACH message to the base station 110. In this case, the base station 110 may determine that the RACH message was received directly from a UE 120 if the RACH message is not modified or may determine that the RACH message was received indirectly from a UE 120 via repeater 140 if the RACH message is modified. For example, the repeater 140 may modify a frequency of the RACH message, such as by applying a frequency offset to a RACH message received from the UE 120. The RACH message transmitted by the UE 120 may have a baseline frequency (e.g., a default frequency or the like).

In this case, if the base station 110 determines that a RACH message is received with a baseline RACH frequency and/or is within a threshold tolerance of a baseline RACH frequency, then the base station 110 may determine that the RACH message was transmitted directly to the base station 110 by a UE 120. If the base station 110 determines that a RACH message is received with a frequency that is offset from the baseline RACH frequency (e.g., by at least a threshold offset configured for and/or applied by the repeater 140) and/or is not within a threshold tolerance of a baseline RACH frequency, then the base station 110 may determine that the RACH message was transmitted indirectly to the base station 110 by a UE 120 via a repeater 140.

As shown by reference number 735, in some aspects, the base station 110 may configure different resource sets for direct links and indirect links to be used for beam management (e.g., associated with RACH messages). For example, the base station 110 may transmit (e.g., to a UE 120) a configuration that indicates a first resource set and a second resource set (e.g., for RACH occasions, for transmission of RACH preambles, and/or the like). The first resource set may be configured for beam management for direct links between UEs 120 and the base station 110, and the second resource set may be configured for beam management for indirect links between UEs 120 and the base station 110 via the repeater 140. In some aspects, the first resource set and the second resource set may be orthogonal with one another (e.g., may be non-overlapping). In this case, the base station 110 may determine whether the RACH message was transmitted directly to the base station 110 by a UE 120 or was transmitted indirectly to the base station 110 by a UE 120 via a repeater 140 based at least in part on whether the RACH message is received in the first resource set or the second resource set. For example, if the RACH message is received in a resource of the first resource set, then the base station 110 may determine that the RACH message was received directly from the UE 120. Conversely, if the RACH message is received in a resource of the second resource set, then the base station 110 may determine that the RACH message was received indirectly from the UE 120 via repeater 140.

Additionally, or alternatively, the base station 110 may configure the repeater 140 to refrain from relaying communications received in a first resource set and to relay communications received in a second resource set. In some aspects, the first resource set may be configured for beam management for direct links between UEs 120 and the base station 110, and the second resource set may be configured for beam management for both direct links and indirect links. In this case, the base station 110 may determine whether the RACH message was transmitted directly to the base station 110 by a UE 120 or was transmitted indirectly to the base station 110 by a UE 120 via a repeater 140 based at least in part on whether the RACH message is received in both the first resource set and the second resource set or is received in only the second resource set (and not the first resource set). For example, if the RACH message is received in a resource of the first resource set and a resource of the second resource set, then the base station 110 may determine that the RACH message was received directly from the UE 120 because the RACH message was received from both a UE 120 and a repeater 140. Conversely, if the RACH message is received in only a resource of the second resource set and not a resource of the first resource set, then the base station 110 may determine that the RACH message was received indirectly from the UE 120 via repeater 140 because the RACH message was received only from the repeater 140 (and not directly from a UE 120).

Additionally, or alternatively, when the repeater 140 is configured to refrain from relaying communications received in a first resource set and to relay communications received in a second resource set, in some aspects, the first resource set and the second resource set may overlap in time. For example, the first resource set may correspond to a first time interval that is longer than and that overlaps with a second time interval corresponding to the second resource set. In some aspects, the base station 110 may transmit a timing synchronization signal to the repeater 140 to determine and/or configure the first time interval and/or the second time interval. In this case, a UE 120 may transmit a RACH message in the first time interval, and the repeater 140 may relay a portion of the RACH message that occurs in the second time interval (e.g., which is partly or entirely included in the first time interval). Alternatively, the UE 120 may repeat the RACH message in the first time interval and the second time interval, and the repeater 140 may relay only the RACH message received in the second time interval. The base station 110 may compare a signal received in the first time interval and the second time interval to determine whether the RACH message was received directly or indirectly from the UE 120. For example, if the signal is the same in both time intervals (indicating that a repeater 140 did not receive and relay a signal in the second time interval), then the base station 110 may determine that the RACH message was received directly from the UE 120. If the signal is different (indicating that the signal was received and relayed by the repeater 140 in the second time interval), then the base station 110 may determine that the RACH message was received indirectly from the UE 120 via a repeater 140.

As shown by reference number 735, the base station 110 may perform a beam management procedure based at least in part on whether the RACH message was received via a direct link or an indirect link. For example, the base station 110 may perform a less complex beam management procedure by communicating directly with the UE 120 when the RACH message is received via a direct link. In this case, the base station 110 may not need to configure a repeater 140 to receive and relay beam management messages via different beams, and the base station 110 may not need to repeat such beam management messages so that the beam management messages can be relayed by the repeater 140 using different Rx beams and/or Tx beams of the repeater 140. Conversely, the base station 110 may perform a more complex beam management procedure by communicating indirectly with the UE 120 via the repeater 140 when the RACH message is received via an indirect link. In this case, the base station 110 may need to configure the repeater 140 to receive and relay beam management messages via different beams, and the base station 110 may need to repeat such beam management messages so that the beam management messages can be relayed by the repeater 140 using different Rx beams and/or Tx beams of the repeater 140. Additionally, or alternatively, the base station 110 may instruct the repeater 140 to power down and/or to refrain from relaying messages for one or more resources used to communicate with the UE 120 when the UE 120 communicates directly with the base station 110. In this way, resources may be conserved and interference may be reduced, as described above in connection with FIG. 6. In some aspects, the base station 110 may instruct the repeater 140 to remain powered up and/or to relay messages for one or more resources used to communicate with the UE 120 via the repeater 140 when the UE 120 communicates indirectly with the base station 110 via the millimeter wave repeater. In this way, the base station 110 may maintain communication with the UE 120 (e.g., via the repeater 140).

As indicated above, FIG. 7 is provided as an example. Other examples may differ from what is described with regard to FIG. 7.

Figure 8:
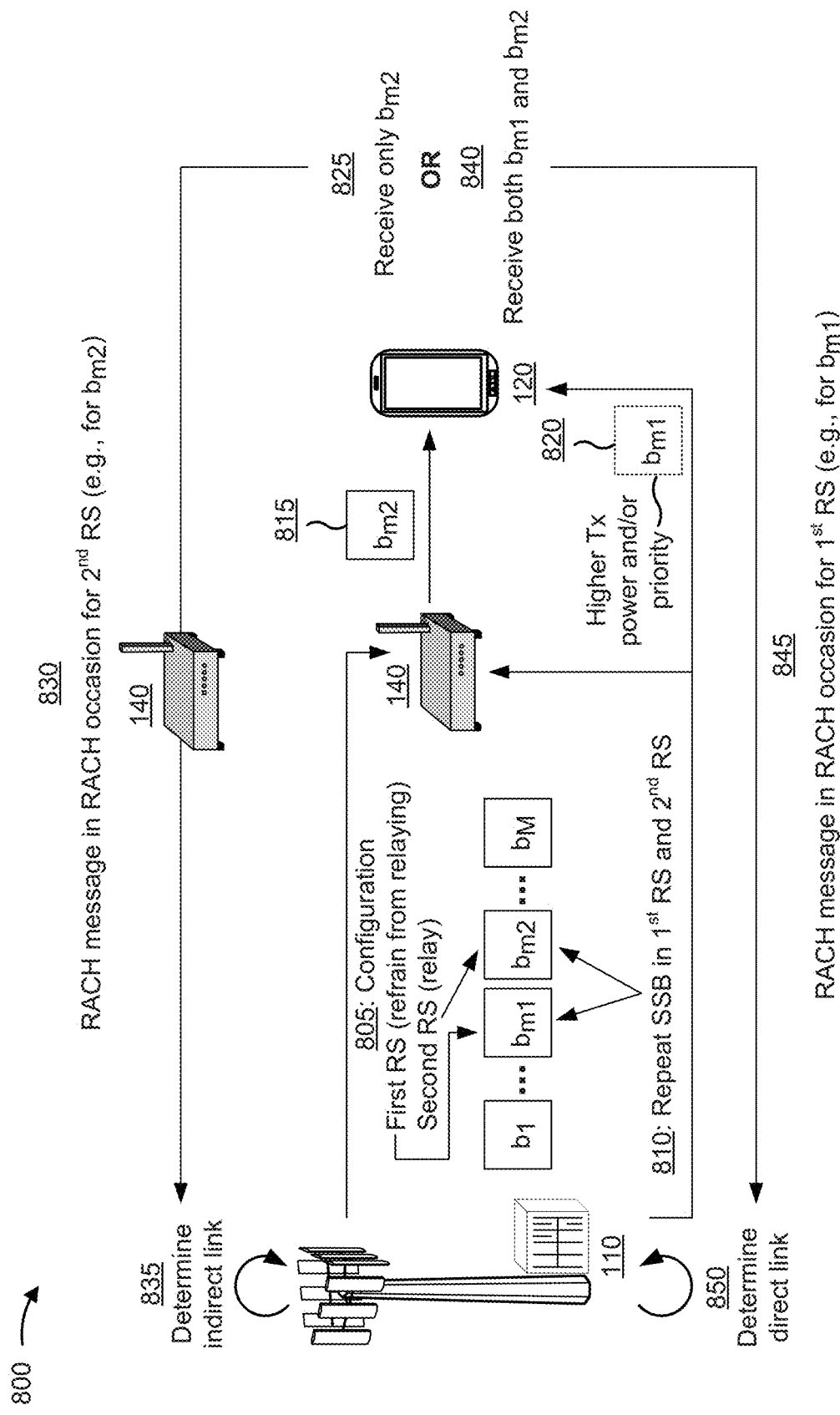

FIG. 8 is a diagram illustrating another example 800 of beam management for direct and indirect links, in accordance with various aspects of the present disclosure.

As shown by reference number 805, a base station 110 may transmit a configuration that instructs a repeater 140 to refrain from relaying communications received in a first resource set and to relay communications received in a second resource set. In some aspects, the first resource set is configured for beam management for direct links between UEs 120 and the base station 110 and the second resource set is configured for beam management for indirect links between UEs 120 and the base station 110 via the repeater 140.

As shown by reference number 810, the base station 110 may repeat transmission of a synchronization signal block (SSB) in the first resource set and the second resource set. For example, the base station 110 may perform a beam-sweeping procedure to transmit SSBs via beams 1 through M. One or more SSBs (e.g., each SSB) may be repeated in the first resource set (e.g., a first time resource, such as a first slot) and the second resource set (e.g., a second time resource, such as a second slot). Thus, as shown, an SSB may be transmitted on beam m at a first time (e.g., shown as $b_{m1}$) and may be repeated on beam m at a second time (e.g., shown as $b_{m2}$).

As shown by reference number 815, due to the configuration by the base station 110, the repeater 140 may relay the SSB(s) received by the repeater 140 in the second resource set (e.g., $b_{m2}$). Also due to the configuration, the repeater 140 may refrain from relaying the SSB(s) received by the repeater 140 in the first resource set (e.g., $b_{m1}$). As shown by reference number 820, the base station 110 may transmit SSB(s) in the first resource set with a higher Tx power and/or a higher priority than SSB(s) transmitted in the second resource set. In some aspects, the base station 110 may indicate the priority to the UE 120. For example, the UE 120 may receive the configuration transmitted by the base station 110 and may use the configuration to assign a higher priority to SSBs received in the first resource set as compared to SSBs received in the second resource set.

As shown by reference number 825, in some cases, the UE 120 may receive an SSB in the second resource set and may not receive a corresponding SSB in the first resource set. In this case, as shown by reference number 830, the UE 120 may transmit a RACH message in a RACH occasion corresponding to the SSB received in the second resource set. The RACH message transmitted by the UE 120 may include a RACH preamble (e.g., RACH MSG 1) in a four-step RACH procedure or may include the RACH preamble and a RACH payload (e.g., in RACH MSG A that combines RACH MSG 1 and RACH MSG 3) in a two-step RACH procedure. As shown by reference number 835, the base station 110 may receive (e.g., via the repeater 140) the RACH message in the RACH occasion corresponding to the second resource set and may determine that the RACH message was received via an indirect link with the UE 120

(via the repeater 140) based at least in part on receiving the RACH message in the RACH occasion corresponding to the second resource set.

As shown by reference number 840, in some cases, the UE 120 may receive an SSB in the first resource set and may also receive a corresponding SSB in the second resource set. In this case, as shown by reference number 845, the UE 120 may transmit a RACH message in a RACH occasion corresponding to the SSB received in the first resource set due to the SSB being transmitted in the first resource set with a higher Tx power, a higher priority, and/or the like. The RACH message transmitted by the UE 120 may include a RACH preamble (e.g., RACH MSG 1) in a four-step RACH procedure or may include the RACH preamble and a RACH payload (e.g., in RACH MSG A that combines RACH MSG 1 and RACH MSG 3) in a two-step RACH procedure. As shown by reference number 850, the base station 110 may receive (e.g., directly from the UE 120) the RACH message in the RACH occasion corresponding to the first resource set and may determine that the RACH message was received via a direct link with the UE 120 based at least in part on receiving the RACH message in the RACH occasion corresponding to the first resource set.

In some aspects, the base station 110 may perform a beam management procedure based at least in part on whether the RACH message was received via a direct link or an indirect link, as described above in connection with FIG. 7. In this way, resources may be conserved, interference may be reduced, and/or one or more beams may be appropriately configured, as described elsewhere herein.

As indicated above, FIG. 8 is provided as an example. Other examples may differ from what is described with regard to FIG. 8.

Figure 9:
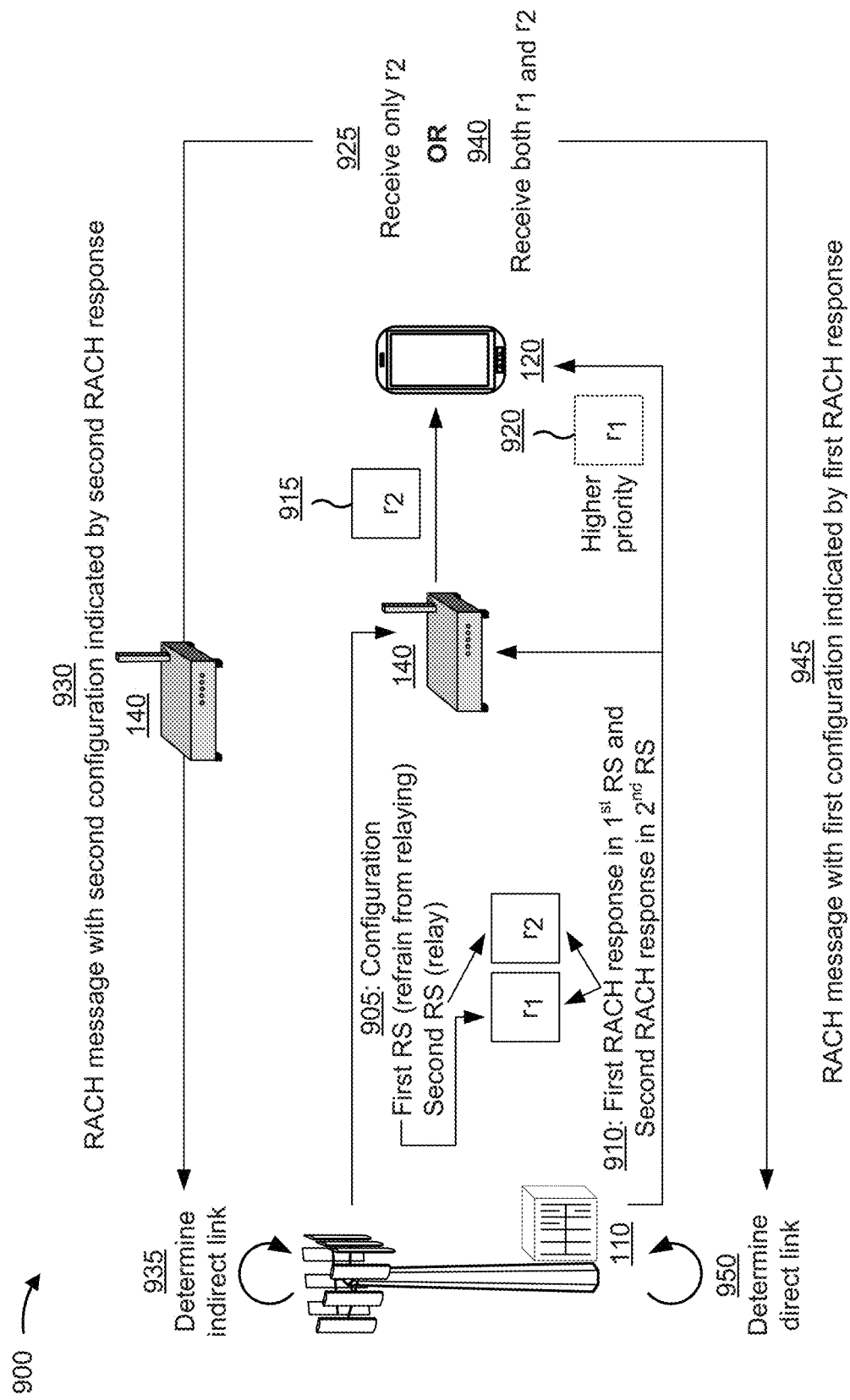

FIG. 9 is a diagram illustrating another example 900 of beam management for direct and indirect links, in accordance with various aspects of the present disclosure.

As shown by reference number 905, a base station 110 may transmit a configuration that instructs a repeater 140 to refrain from relaying communications received in a first resource set and to relay communications received in a second resource set, in a similar manner as described above. In some aspects, the first resource set is configured for beam management for direct links between UEs 120 and the base station 110 and the second resource set is configured for beam management for indirect links between UEs 120 and the base station 110 via the repeater 140.

As shown by reference number 910, the base station 110 may repeat transmission of a random access response (e.g., a RACH response, such as MSG 2, MSG B, and/or the like) in the first resource set and the second resource set. For example, the base station 110 may receive a RACH message (e.g., MSG 1 and/or MSG A) directly or indirectly from a UE 120 and may transmit a RACH response based at least in part on receiving the RACH message. The base station 110 may transmit a first RACH response (shown as $r_1$) in a first resource (e.g., a first slot) included in the first resource set and may transmit a second RACH response (shown as $r_2$) in a second resource (e.g., a second slot) included in the second resource set. In some aspects, the base station 110 may transmit the first and second RACH responses on the same beam, which may be a beam corresponding to a beam via which a RACH preamble is received.

The first RACH response and the second RACH response may indicate different configurations for transmission of a RACH message (e.g., a RACH payload, MSG 3, MSG B, and/or the like) by the UE 120. For example, the first RACH response may indicate a first configuration for a RACH payload, such as a first resource to be used for transmission of the RACH payload, and the second RACH response may indicate a second configuration for a RACH payload, such as a second (e.g., different) resource to be used for transmission of the RACH payload.

As shown by reference number 915, due to the configuration by the base station 110, the repeater 140 may relay the second RACH response received by the repeater 140 in the second resource set (e.g., $r_2$). As shown by reference number 920, also due to the configuration, the repeater 140 may refrain from relaying the first RACH response received by the repeater 140 in the first resource set (e.g., $r_1$). Additionally, or alternatively, the first RACH response may be transmitted with a higher priority than the second RACH response. In some aspects, the base station 110 may indicate the priority to the UE 120. For example, the UE 120 may receive the configuration transmitted by the base station 110 and may use the configuration to assign a higher priority to RACH messages received in the first resource set as compared to RACH messages received in the second resource set.

As shown by reference number 925, in some cases, the UE 120 may receive the second RACH response and may not receive the first RACH response. In this case, as shown by reference number 930, the UE 120 may transmit a RACH message using the second configuration indicated by the second RACH response. For example, the UE 120 may transmit the RACH message in a second RACH occasion indicated in the second RACH response. The RACH message transmitted by the UE 120 may include a RACH payload, such as RACH MSG 3 in a four-step RACH procedure. As shown by reference number 935, the base station 110 may receive (e.g., via the repeater 140) the RACH message according to the second configuration and may determine that the RACH message was received via an indirect link with the UE 120 (via the repeater 140) based at least in part on receiving the RACH message according to the second configuration.

As shown by reference number 940, in some cases, the UE 120 may receive both the first RACH message and the second RACH message. In this case, as shown by reference number 945, the UE 120 may transmit a RACH message using the first configuration indicated by the first RACH response due to the first RACH response being associated with a higher priority than the second RACH response. For example, the UE 120 may transmit the RACH message in a first RACH occasion indicated in the first RACH response. The RACH message transmitted by the UE 120 may include a RACH payload, such as RACH MSG 3 in a four-step RACH procedure. As shown by reference number 950, the base station 110 may receive the RACH message according to the first configuration and may determine that the RACH message was received via a direct link with the UE 120 based at least in part on receiving the RACH message according to the first configuration.

In some aspects, the base station 110 may perform a beam management procedure based at least in part on whether the RACH message was received via a direct link or an indirect link, as described above in connection with FIG. 7. In this way, resources may be conserved, interference may be reduced, and/or one or more beams may be appropriately configured, as described elsewhere herein.

As indicated above, FIG. 9 is provided as an example. Other examples may differ from what is described with regard to FIG. 9.

Figure 10:
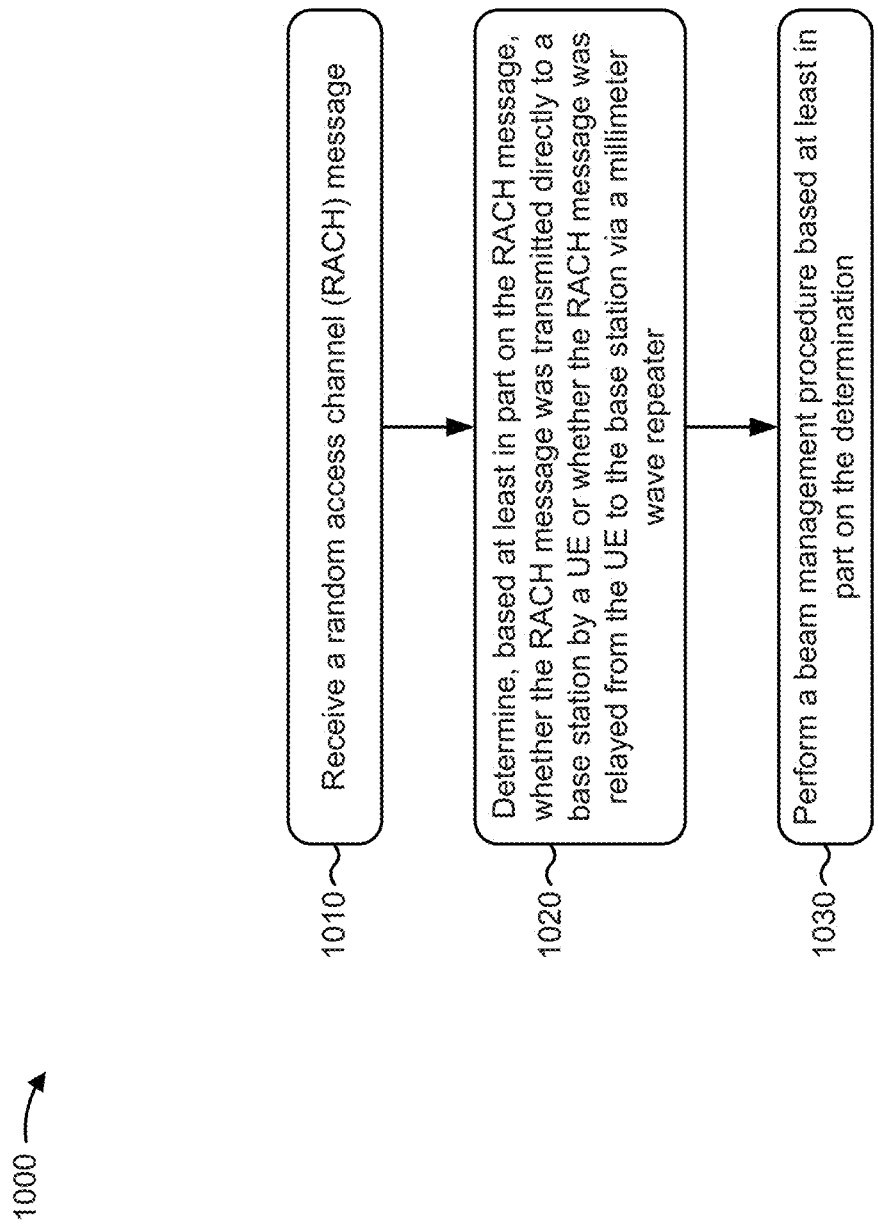
FIGS. 10-12 are diagrams illustrating example processes relating to beam management for direct and indirect links, in accordance with various aspects of the present disclosure.

FIG. 10 is a diagram illustrating an example process 1000 performed, for example, by a base station, in accordance with various aspects of the present disclosure. Example process 1000 is an example where a base station (e.g., base station 110 and/or the like) performs operations associated with beam management for direct and indirect links.

As shown in FIG. 10, in some aspects, process 1000 may include receiving a random access channel (RACH) message (block 1010). For example, the base station (e.g., using receive processor 238, controller/processor 240, memory 242, and/or the like) may receive a RACH message, as described above in connection with FIGS. 7, 8, and/or 9.

As further shown in FIG. 10, in some aspects, process 1000 may include determining, based at least in part on the RACH message, whether the RACH message was transmitted directly to the base station by a user equipment (UE) or whether the RACH message was relayed from the UE to the base station via a millimeter wave repeater (block 1020). For example, the base station (e.g., using receive processor 238, controller/processor 240, memory 242, and/or the like) may determine, based at least in part on the RACH message, whether the RACH message was transmitted directly to the base station by a UE or whether the RACH message was relayed from the UE to the base station via a millimeter wave repeater, as described above in connection with FIGS. 7, 8, and/or 9.

As further shown in FIG. 10, in some aspects, process 1000 may include performing a beam management procedure based at least in part on the determination (block 1030). For example, the base station (e.g., using transmit processor 220, receive processor 238, controller/processor 240, memory 242, and/or the like) may perform a beam management procedure based at least in part on the determination, as described above in connection with FIGS. 7, 8, and/or 9.

Process 1000 may include additional aspects, such as any single aspect or any combination of aspects described below and/or in connection with one or more other processes described elsewhere herein.

In a first aspect, process 1000 includes receiving, from the millimeter wave repeater, a report that indicates a signal power of an input signal received by the millimeter wave repeater in a RACH occasion corresponding to the RACH message; and determining whether the RACH message was transmitted directly to the base station by the UE or was relayed via the millimeter wave repeater based at least in part on the report.

In a second aspect, alone or in combination with the first aspect, the base station is configured to determine that the RACH message was transmitted directly to the base station by the UE if the signal power does not satisfy a threshold and is configured to determine that the RACH message was relayed via the millimeter wave repeater if the signal power satisfies the threshold.

In a third aspect, alone or in combination with one or more of the first and second aspects, process 1000 includes transmitting a configuration that indicates a first resource set and a second resource set for beam management, wherein the first resource set is configured for beam management for a direct link between the UE and the base station and the second resource set is configured for beam management for an indirect link between the UE and the base station via the millimeter wave repeater; and determining whether the RACH message was transmitted directly to the base station by the UE or was relayed via the millimeter wave repeater based at least in part on whether the RACH message is received in the first resource set or the second resource set.

In a fourth aspect, alone or in combination with one or more of the first through third aspects, process 1000 includes transmitting a configuration that instructs the millimeter wave repeater to refrain from relaying communications received in a first resource set and to relay communications received in a second resource set, wherein the first resource set is configured for beam management for a direct link between the UE and the base station and the second resource set is configured for beam management for an indirect link between the UE and the base station via the millimeter wave repeater and the direct link between the UE and the base station; and determining whether the RACH message was transmitted directly to the base station by the UE or was relayed via the millimeter wave repeater based at least in part on whether the RACH message is received in the first and second resource set or only the second resource set.

In a fifth aspect, alone or in combination with one or more of the first through fourth aspects, process 1000 includes estimating a round trip time associated with the RACH message; and determining whether the RACH message was transmitted directly to the base station by the UE or was relayed via the millimeter wave repeater based at least in part on the estimated round trip time.

In a sixth aspect, alone or in combination with one or more of the first through fifth aspects, the determination is based at least in part on a comparison of the estimated round trip time to a threshold.

In a seventh aspect, alone or in combination with one or more of the first through sixth aspects, the determination is based at least in part on a frequency of the RACH message.

In an eighth aspect, alone or in combination with one or more of the first through seventh aspects, the base station is configured to determine that the RACH message was transmitted directly to the base station by the UE if the frequency is within a threshold tolerance of a baseline RACH frequency and is configured to determine that the RACH message was relayed via the millimeter wave repeater if the frequency is offset from the baseline RACH frequency by at least a threshold offset.

In a ninth aspect, alone or in combination with one or more of the first through eighth aspects, process 1000 includes transmitting a configuration that instructs the millimeter wave repeater to refrain from relaying communications received in a first resource set and to relay communications received in a second resource set, wherein the first resource set is configured for beam management for a direct link between the UE and the base station and the second resource set is configured for beam management for an indirect link between the UE and the base station via the millimeter wave repeater; repeating transmission of a synchronization signal block (SSB) in the first resource set and the second resource set; and determining whether the RACH message was transmitted directly to the base station by the UE or was relayed via the millimeter wave repeater based at least in part on whether a RACH occasion of the RACH message corresponds to the first resource set or the second resource set.

In a tenth aspect, alone or in combination with one or more of the first through ninth aspects, the SSB is transmitted in the first resource set with a higher transmission power than a corresponding transmission of the SSB in the second resource set.

In an eleventh aspect, alone or in combination with one or more of the first through tenth aspects, the SSB transmitted in the first resource set is associated with a higher priority than a corresponding transmission of the SSB in the second resource set.

In a twelfth aspect, alone or in combination with one or more of the first through eleventh aspects, the priority is indicated to the UE.

In a thirteenth aspect, alone or in combination with one or more of the first through twelfth aspects, the priority is indicated by transmitting a configuration for a first resource set and a second resource set, wherein the first resource set is configured for beam management for a direct link between the UE and the base station, and the second resource set is configured for beam management for an indirect link between the UE and the base station via the millimeter wave repeater.

In a fourteenth aspect, alone or in combination with one or more of the first through thirteenth aspects, the RACH message is a RACH preamble.

In a fifteenth aspect, alone or in combination with one or more of the first through fourteenth aspects, the RACH message is a RACH payload.

In a sixteenth aspect, alone or in combination with one or more of the first through fifteenth aspects, process 1000 includes transmitting a configuration that instructs the millimeter wave repeater to refrain from relaying communications received in a first resource set and to relay communications received in a second resource set, wherein the first resource set is configured for beam management for a direct link between the UE and the base station and the second resource set is configured for beam management for an indirect link between the UE and the base station via the millimeter wave repeater; transmitting a first RACH response in the first resource set, wherein the first RACH response indicates a first configuration for a RACH payload; transmitting a second RACH response in the second resource set, wherein the second RACH response indicates a second configuration for the RACH payload; receiving the RACH payload; and determining whether the RACH message was transmitted directly to the base station by the UE or was relayed via the millimeter wave repeater based at least in part on whether the RACH payload is received with the first configuration or the second configuration.

In a seventeenth aspect, alone or in combination with one or more of the first through sixteenth aspects, process 1000 includes transmitting an instruction, to the millimeter wave repeater, to power down the millimeter wave repeater based at least in part on a determination that the RACH message was transmitted directly to the base station by the UE.

In an eighteenth aspect, alone or in combination with one or more of the first through seventeenth aspects, process 1000 includes transmitting an instruction, to the millimeter wave repeater, to remain powered up based at least in part on a determination that the RACH message was relayed from the UE to the base station via the millimeter wave repeater.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
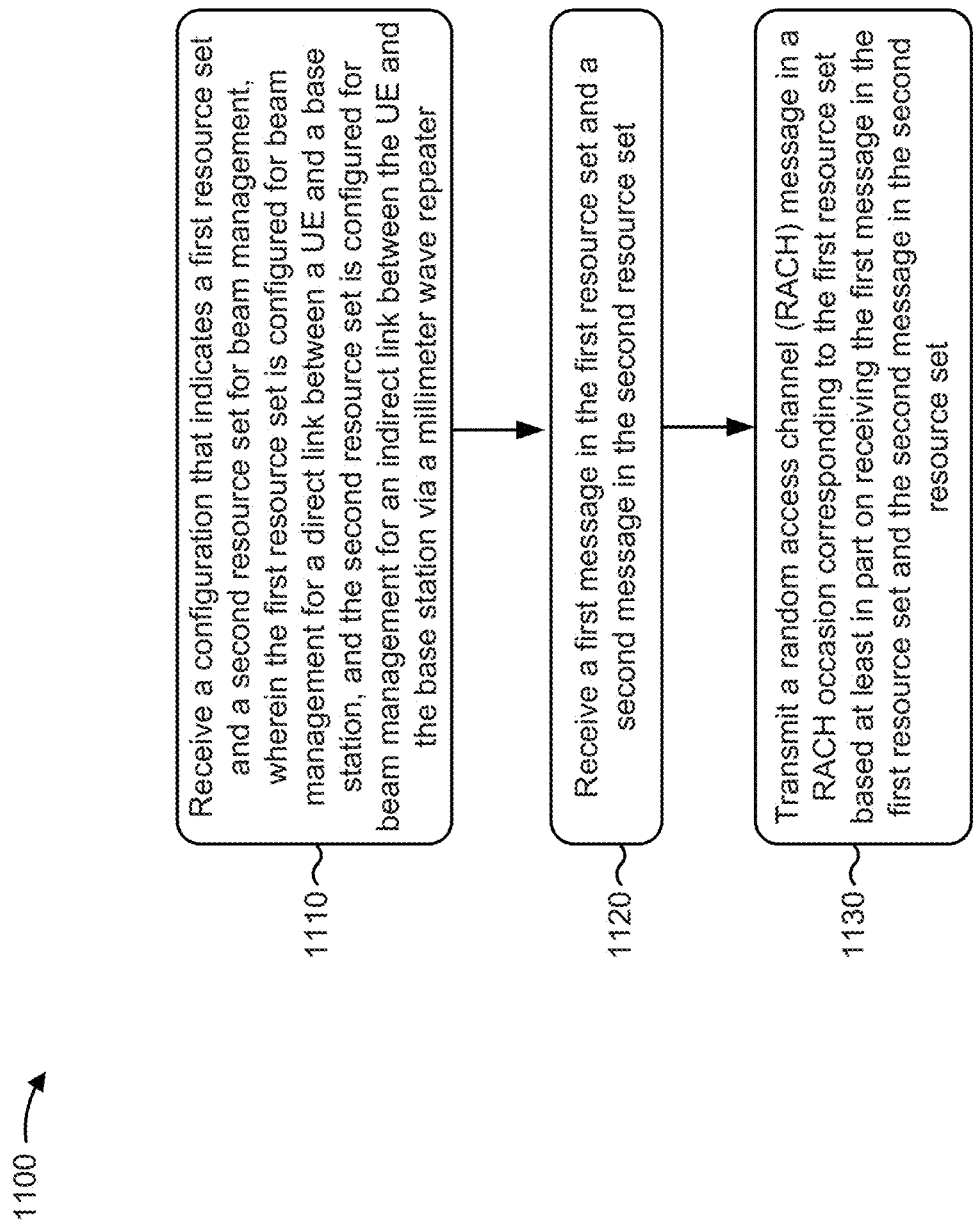

FIG. 11 is a diagram illustrating an example process 1100 performed, for example, by a UE, in accordance with various aspects of the present disclosure. Example process 1100 is an example where a UE (e.g., UE 120 and/or the like) performs operations associated with beam management for direct and indirect links.

As shown in FIG. 11, in some aspects, process 1100 may include receiving a configuration that indicates a first resource set and a second resource set for beam management, wherein the first resource set is configured for beam management for a direct link between the UE and a base station, and the second resource set is configured for beam management for an indirect link between the UE and the base station via a millimeter wave repeater (block 1110). For example, the UE (e.g., using receive processor 258, controller/processor 280, memory 282, and/or the like) may receive a configuration that indicates a first resource set and a second resource set for beam management, as described above in connection with FIGS. 7, 8, and/or 9. In some aspects, the first resource set is configured for beam management for a direct link between the UE and a base station, and the second resource set is configured for beam management for an indirect link between the UE and the base station via a millimeter wave repeater.

As further shown in FIG. 11, in some aspects, process 1100 may include receiving a first message in the first resource set and a second message in the second resource set (block 1120). For example, the UE (e.g., using receive processor 258, controller/processor 280, memory 282, and/or the like) may receive a first message in the first resource set and a second message in the second resource set, as described above in connection with FIGS. 7, 8, and/or 9.

As further shown in FIG. 11, in some aspects, process 1100 may include transmitting a RACH message in a RACH occasion corresponding to the first resource set based at least in part on receiving the first message in the first resource set and the second message in the second resource set (block 1130). For example, the UE (e.g., using transmit processor 264, controller/processor 280, memory 282, and/or the like) may transmit a RACH message in a RACH occasion corresponding to the first resource set based at least in part on receiving the first message in the first resource set and the second message in the second resource set, as described above in connection with FIGS. 7, 8, and/or 9.

Process 1100 may include additional aspects, such as any single aspect or any combination of aspects described below and/or in connection with one or more other processes described elsewhere herein.

In a first aspect, the RACH message is a RACH preamble.

In a second aspect, alone or in combination with the first aspect, the first message and the second message are repeated transmissions of a synchronization signal block.

In a third aspect, alone or in combination with one or more of the first and second aspects, the RACH message is a RACH payload.

In a fourth aspect, alone or in combination with one or more of the first through third aspects, the first message is a first RACH response that indicates a first configuration for a RACH payload, and the second message is a second RACH response that indicates a second configuration for a RACH payload.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
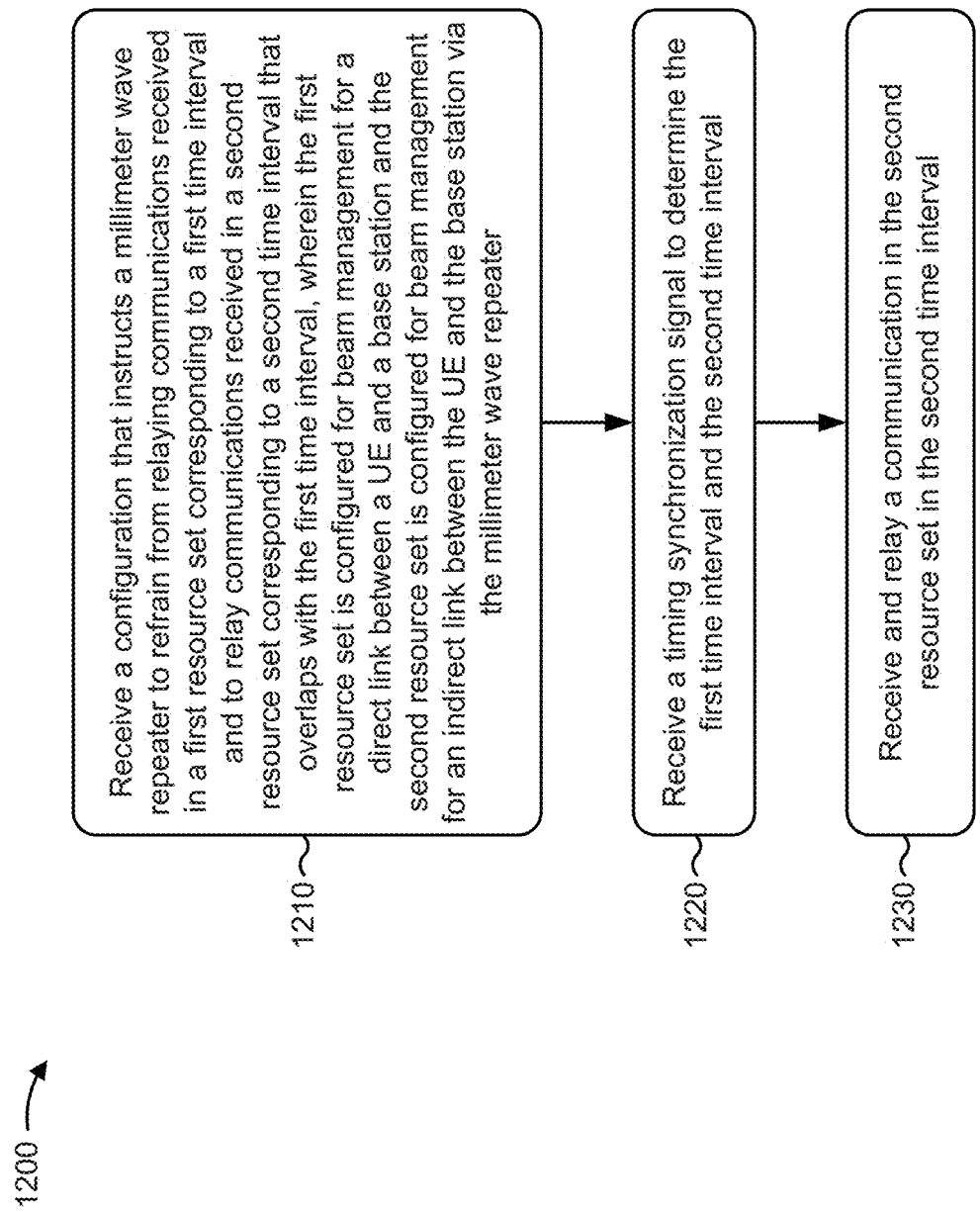

FIG. 12 is a diagram illustrating an example process 1200 performed, for example, by a millimeter wave repeater, in accordance with various aspects of the present disclosure. Example process 1200 is an example where a millimeter wave repeater (e.g., millimeter wave repeater 140 and/or the like) performs operations associated with beam management for direct and indirect links.

As shown in FIG. 12, in some aspects, process 1200 may include receiving a configuration that instructs the millimeter wave repeater to refrain from relaying communications received in a first resource set corresponding to a first time interval and to relay communications received in a second resource set corresponding to a second time interval that overlaps with the first time interval, wherein the first resource set is configured for beam management for a direct link between a user equipment (UE) and a base station and the second resource set is configured for beam management for an indirect link between the UE and the base station via the millimeter wave repeater (block 1210). For example, the millimeter wave repeater (e.g., using communication component 340 and/or the like) may receive a configuration that instructs the millimeter wave repeater to refrain from relaying communications received in a first resource set corresponding to a first time interval and to relay communications received in a second resource set corresponding to a second time interval that overlaps with the first time interval, as described above in connection with FIGS. 7, 8, and/or 9. In some aspects, the first resource set is configured for beam management for a direct link between a UE and a base station and the second resource set is configured for beam management for an indirect link between the UE and the base station via the millimeter wave repeater.

As further shown in FIG. 12, in some aspects, process 1200 may include receiving a timing synchronization signal to determine the first time interval and the second time interval (block 1220). For example, the millimeter wave repeater (e.g., using communication component 340 and/or the like) may receive a timing synchronization signal to determine the first time interval and the second time interval, as described above in connection with FIGS. 7, 8, and/or 9.

As further shown in FIG. 12, in some aspects, process 1200 may include receiving and relaying a communication in the second resource set in the second time interval (block 1230). For example, the millimeter wave repeater (e.g., using antenna array 310, gain component 320, controller 330, MUX/DEMUX 350, and/or the like) may receive and relay a communication in the second resource set in the second time interval, as described above in connection with FIGS. 7, 8, and/or 9.

Process 1200 may include additional aspects, such as any single aspect or any combination of aspects described below and/or in connection with one or more other processes described elsewhere herein.

In a first aspect, the communication is a synchronization signal block.

In a second aspect, alone or in combination with the first aspect, the communication is a RACH response.

In a third aspect, alone or in combination with one or more of the first and second aspects, process 1200 includes transmitting, to the base station, a report that indicates a signal power of an input signal received by the millimeter wave repeater in a RACH occasion.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network node, comprising:
receiving a random access channel (RACH) message;
determining, based at least in part on the RACH message, whether the RACH message was transmitted directly to the network node by a user equipment (UE) or whether the RACH message was relayed from the UE to the network node via a millimeter wave repeater; and
performing a beam management procedure, of a plurality of beam management procedures, based at least in part on the determination, wherein the beam management procedure is a first beam management procedure, of the plurality of beam management procedures and associated with the RACH message being transmitted directly to the network node by the UE, or a second beam management procedure, of the plurality of beam management procedures, associated with the RACH message being relayed from the UE to the network node via the millimeter wave repeater.

2. The method of claim 1, further comprising:
receiving, from the millimeter wave repeater, a report that indicates a signal power of an input signal received by the millimeter wave repeater in a RACH occasion corresponding to the RACH message,
wherein the determination is further based at least in part on the report.

3. The method of claim 2, wherein the network node is configured to determine that the RACH message was transmitted directly to the network node by the UE if the signal power does not satisfy a threshold and is configured to determine that the RACH message was relayed via the millimeter wave repeater if the signal power satisfies the threshold.

4. The method of claim 1, further comprising:
transmitting a configuration that indicates a first resource set and a second resource set for beam management, wherein the first resource set is configured for beam management for a direct link between the UE and the network node and the second resource set is configured for beam management for an indirect link between the UE and the network node via the millimeter wave repeater,
wherein the determination is based at least in part on whether the RACH message is received in the first resource set or the second resource set.

5. The method of claim 1, further comprising:
transmitting a configuration that instructs the millimeter wave repeater to refrain from relaying communications received in a first resource set and to relay communications received in a second resource set, wherein the first resource set is configured for beam management for a direct link between the UE and the network node and the second resource set is configured for beam management for an indirect link between the UE and the network node via the millimeter wave repeater and the direct link between the UE and the network node,
wherein the determination is based at least in part on whether the RACH message is received in the first and second resource set or only the second resource set.

6. The method of claim 1, further comprising:
estimating a round trip time associated with the RACH message,
wherein the determination is based at least in part on the estimated round trip time.

7. The method of claim 6, wherein the determination is based at least in part on a comparison of the estimated round trip time to a threshold.

8. The method of claim 1, wherein the determination is further based at least in part on a frequency of the RACH message.

9. The method of claim 8, wherein the network node is configured to:
determine that the RACH message was transmitted directly to the network node by the UE if the frequency is within a threshold tolerance of a baseline RACH frequency, and
determine that the RACH message was relayed via the millimeter wave repeater if the frequency is offset from the baseline RACH frequency by at least a threshold offset.

10. The method of claim 1, further comprising:
transmitting a configuration that instructs the millimeter wave repeater to refrain from relaying communications received in a first resource set and to relay communications received in a second resource set, wherein the first resource set is configured for beam management for a direct link between the UE and the network node and the second resource set is configured for beam management for an indirect link between the UE and the network node via the millimeter wave repeater; and
repeating transmission of a synchronization signal block (SSB) in the first resource set and the second resource set,
wherein the determination is based at least in part on whether a RACH occasion of the RACH message corresponds to the first resource set or the second resource set.

11. The method of claim 10, wherein the SSB is transmitted in the first resource set with a higher transmission power than a corresponding transmission of the SSB in the second resource set.

12. The method of claim 10, wherein the SSB transmitted in the first resource set is associated with a higher priority than a corresponding transmission of the SSB in the second resource set.

13. The method of claim 12, wherein the priority is indicated to the UE.

14. The method of claim 13, wherein the priority is indicated by transmitting a configuration for a first resource set and a second resource set, wherein the first resource set is configured for beam management for a direct link between the UE and the network node, and the second resource set is configured for beam management for an indirect link between the UE and the network node via the millimeter wave repeater.

15. The method of claim 1, wherein the RACH message is a RACH preamble.

16. The method of claim 1, wherein the RACH message is a RACH payload.

17. The method of claim 1, further comprising:
transmitting a configuration that instructs the millimeter wave repeater to refrain from relaying communications received in a first resource set and to relay communications received in a second resource set, wherein the first resource set is configured for beam management for a direct link between the UE and the network node and the second resource set is configured for beam management for an indirect link between the UE and the network node via the millimeter wave repeater;
transmitting a first RACH response in the first resource set, wherein the first RACH response indicates a first configuration for a RACH payload;
transmitting a second RACH response in the second resource set, wherein the second RACH response indicates a second configuration for the RACH payload; and
receiving the RACH payload,
wherein the determination is based at least in part on whether the RACH payload is received with the first configuration or the second configuration.

18. The method of claim 1, further comprising:
transmitting an instruction, to the millimeter wave repeater, to power down the millimeter wave repeater based at least in part on the determination that the RACH message was transmitted directly to the network node by the UE.

19. The method of claim 1, further comprising:
transmitting an instruction, to the millimeter wave repeater, to remain powered up based at least in part on the determination that the RACH message was relayed from the UE to the network node via the millimeter wave repeater.

20. A method of wireless communication performed by a user equipment (UE), comprising:
receiving a configuration that indicates a first resource set and a second resource set for beam management, wherein the first resource set is configured for beam management for a direct link between the UE and a network node, and the second resource set is configured for beam management for an indirect link between the UE and the network node via a millimeter wave repeater;
receiving a first message in the first resource set and a second message in the second resource set; and
transmitting a random access channel (RACH) message in a RACH occasion corresponding to the first resource set based at least in part on receiving the first message in the first resource set and the second message in the second resource set.

21. The method of claim 20, wherein the RACH message is a RACH preamble.

22. The method of claim 20, wherein the first message and the second message are repeated transmissions of a synchronization signal block.

23. The method of claim 20, wherein the RACH message is a RACH payload.

24. The method of claim 20, wherein the first message is a first RACH response that indicates a first configuration for a RACH payload, and wherein the second message is a second RACH response that indicates a second configuration for a RACH payload.

25. A method of wireless communication performed by a millimeter wave repeater, comprising:
receiving a configuration that instructs the millimeter wave repeater to refrain from relaying communications received in a first resource set corresponding to a first time interval and to relay communications received in a second resource set corresponding to a second time interval that overlaps with the first time interval, wherein the first resource set is configured for beam management for a direct link between a user equipment (UE) and a network node and the second resource set is configured for beam management for an indirect link between the UE and the network node via the millimeter wave repeater;
receiving a timing synchronization signal to determine the first time interval and the second time interval; and
receiving and relaying a communication in the second resource set in the second time interval.

26. The method of claim 25, wherein the communication is a synchronization signal block.

27. The method of claim 25, wherein the communication is a random access channel (RACH) response.

28. The method of claim 25, further comprising:
transmitting, to the network node, a report that indicates a signal power of an input signal received by the millimeter wave repeater in a random access channel (RACH) occasion.

29. A network node for wireless communication, comprising:
a memory; and
one or more processors coupled to the memory, the one or more processors configured to:
receive a random access channel (RACH) message;
determine, based at least in part on the RACH message, whether the RACH message was transmitted directly to the network node by a user equipment (UE) or whether the RACH message was relayed from the UE to the network node via a millimeter wave repeater; and
perform a beam management procedure, of a plurality of beam management procedures, based at least in part on the determination, wherein the beam management procedure is a first beam management procedure, of the plurality of beam management procedures and associated with the RACH message being transmitted directly to the network node by the UE, or a second beam management procedure, of the plurality of beam management procedures, associated with the RACH message being relayed from the UE to the network node via the millimeter wave repeater.

30. The network node of claim 29, wherein the one or more processors are further configured to:
receive, from the millimeter wave repeater, a report that indicates a signal power of an input signal received by the millimeter wave repeater in a RACH occasion corresponding to the RACH message wherein the determination is further based at least in part on the report.

* * * * *